US008347162B2

(12) United States Patent
Yue et al.

(10) Patent No.: US 8,347,162 B2
(45) Date of Patent: Jan. 1, 2013

(54) COGNITIVE RADIO, ANTI-JAMMING CODING RETRANSMISSION METHODS AND SYSTEMS

(75) Inventors: Guosen Yue, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 1082 days.

(21) Appl. No.: 12/251,713

(22) Filed: Oct. 15, 2008

(65) Prior Publication Data

US 2009/0282309 A1 Nov. 12, 2009

Related U.S. Application Data

(60) Provisional application No. 61/051,099, filed on May 7, 2008.

(51) Int. Cl.
*H04L 1/18* (2006.01)

(52) U.S. Cl. ........ 714/748; 714/704; 370/342; 370/441; 375/240.24; 375/227; 375/267

(58) Field of Classification Search .................. 714/704, 714/748; 370/342, 441; 375/240.24, 227, 375/267
See application file for complete search history.

(56) References Cited

U.S. PATENT DOCUMENTS

| | | | | |
|---|---|---|---|---|
| 5,351,016 | A * | 9/1994 | Dent | 332/103 |
| 6,418,549 | B1 * | 7/2002 | Ramchandran et al. | 714/811 |
| 6,675,346 | B2 * | 1/2004 | Tsunoda | 714/774 |
| 6,728,920 | B1 * | 4/2004 | Ebersman | 714/752 |
| 6,977,888 | B1 * | 12/2005 | Frenger et al. | 370/218 |
| 7,177,658 | B2 * | 2/2007 | Willenegger et al. | 455/522 |
| 7,215,683 | B2 * | 5/2007 | Burkert et al. | 370/476 |
| 7,428,691 | B2 * | 9/2008 | Ouchi | 714/770 |
| 2002/0054578 | A1 * | 5/2002 | Zhang et al. | 370/328 |
| 2002/0136317 | A1 * | 9/2002 | Oelcer et al. | 375/261 |
| 2003/0054755 | A1 * | 3/2003 | Zehavi et al. | 455/1 |
| 2003/0076870 | A1 * | 4/2003 | Moon et al. | 375/130 |
| 2007/0162815 | A1 * | 7/2007 | El-Khamy et al. | 714/752 |
| 2007/0248173 | A1 * | 10/2007 | Hassan et al. | 375/260 |
| 2007/0291866 | A1 * | 12/2007 | Rajappan et al. | 375/267 |
| 2008/0014880 | A1 * | 1/2008 | Hyon et al. | 455/161.1 |
| 2008/0069054 | A1 * | 3/2008 | Ho et al. | 370/335 |
| 2008/0154826 | A1 * | 6/2008 | Backof et al. | 706/45 |
| 2009/0210757 | A1 * | 8/2009 | Yue et al. | 714/704 |

OTHER PUBLICATIONS

Ackland, "High Performance cognitive radio platform with integrated physical and network layer capablities", Jul. 2005, Rutgers University, pp. 1-13.*
Hanratty, "Performance analysis of Hybrid ARQ protocols in slotted direct-sequence CDMA network: Jamming analysis", 1989, Georgia Institute of Technology, pp. 0383-0387.*
Soljanin, "Puntured vs rateless codes for Hybrid ARQ", Mar. 2006, IEEE, pp. 155-159.*
Yue, "Design of Anti-jamming coding for cognitive radio", Aug. 27, 2007, IEEE, pp. 4190-4194.*

(Continued)

*Primary Examiner* — Scott Baderman
*Assistant Examiner* — Jeison C Arcos
(74) *Attorney, Agent, or Firm* — Joseph Kolodka; James Bitetto

(57) ABSTRACT

Implementations of the present principles include methods and systems for retransmitting un-recovered information within a cognitive radio, anti-jamming system. In accordance with aspects of the present principles, encoding schemes may be optimized for retransmission by utilizing a jamming rate and a number of un-recovered packets to minimize packet loss and thereby enhance throughput. In addition, rateless encoding features may be employed to re-encode un-recovered portions of an information sequence for efficient retransmission.

14 Claims, 12 Drawing Sheets

700

701 Determine and compile all possible code graphs $\mathcal{L} = \{l_j\}$ with $\sum l_j = N$ 702 Compute bit error rate for code corresponding to $\mathcal{L}$ 703 All $\mathcal{L}$ evaluated? No / Yes 704 Determine code graph $\mathcal{L}$ with min. $P_b$ and select as optimal short code $\mathcal{L}_3^*$

OTHER PUBLICATIONS

M. Luby; LT Codes; Proc ACM Symp. Foundations of Computer Science. (FOCS) 2002; 10 pages.

J.S. Plank et al.; Small Parity-Check Erasure Codes—Exploration and Observation; Proc. of the 2005 Int'l Conf on Dependable Systems and Networks; 2005; pp. 1-10.

D. Willkomm et al.; Reliable Link Maintenance in Cognitive Radio Systems; IEEE Int'l Symp, New Frontiers Dynamic Spectrum Access Networks (DySPAN 2005); 2005; pp. 371-378.

G. Yue et al.; Efficient Coding Techniques for Recovering Lost Packets in Inference Channels; NEC Laboratories America, Princeton, NJ; Tech. Report 2007-L040; Mar. 2007; pp. 1-32.

G. Yue et al.; Design of Anti-Jamming Coding for Cognitive Radio; Proc. IEEE Global telecom. Conf. (Globecom); Washington, DC; Nov. 2007; pp. 4190-4194.

G. Yue et al.; Optimization of Irregular Repeat Accumulate Codes for MIMO Systems with Iterative Receivers; IEEE Transactions on Wireless Communications, vol. 4, No. 6, Nov. 2005; pp. 2843-2855.

* cited by examiner

1200

1300

Code graph for $\mathcal{L}_3 = \{1,1,1,1,1,1,1\}$

COGNITIVE RADIO, ANTI-JAMMING CODING RETRANSMISSION METHODS AND SYSTEMS

RELATED APPLICATION INFORMATION

This application claims priority to provisional application Ser. No. 61/051,099 filed on May 7, 2008, incorporated herein by reference.

BACKGROUND

1. Technical Field

The present principles generally relate to anti-jamming coding techniques for cognitive radio systems, and, more particularly, to anti-jamming coding methods and systems including retransmission protocols.

2. Description of the Related Art

Recently, cognitive radio has drawn significant interest due to the congestion of unlicensed frequency bands in many countries throughout the world. Cognitive radio techniques are based on the concept of spectrum under-utilization, in which licensed frequency bands are rarely utilized to its maximum potential by licensed users. Indeed, among licensed bandwidth users, there is very little usage on a very large range of spectrum in both time and space. Cognitive radio is therefore a promising solution that aims to introduce secondary, low priority usage of licensed spectrum resources while ensuring that primary usage by licensed users is not interfered with. In accordance with some known cognitive radio systems, such opportunistic spectrum sharing is provided by employing spectrum sensing systems that dynamically identify spectrum bands in which primary users are not active and permit utilization of these spectrum white spaces by secondary users.

As mentioned above, an important constraint in cognitive radio is that the secondary users should not interfere with primary users. Typically, the primary users are not aware of the existence of the secondary users. When a primary user begins signal transmission through channels employed by a secondary user, the secondary user immediately discontinues transmission along these channels and switches to other available channels. Because such interference periods are short, they do not impair the communication of a primary user. However, during these periods, the signals of a secondary user are corrupted by strong interference from the primary user, as a secondary user usually operates with low power profiles to minimize any interference with primary user transmission. Such collision is also commonly referred to as jamming. To reduce packet loss instances and maintain the communication reliability for secondary users, anti-jamming coding techniques are desirable for cognitive radio systems.

With reference to FIG. 1, anti-jamming coding schemes have been studied using a cognitive radio system model in which information and messages are transmitted by secondary users through many parallel subchannels. The cognitive radio system model depicted in FIG. 1 is described in more detail below. Despite the limited success of known anti-jamming coding techniques, packet or information loss nevertheless occurs. To the knowledge of the inventors, retransmission protocols for un-recovered packets and/or information have not been incorporated within anti-jamming coding techniques.

However, retransmission schemes associated with coding in general have been extensively considered with regard to Gaussian or fading channels in relation to hybrid automatic transmission requests in Automatic Repeat Query (ARQ) schemes. Further, ARQ schemes have been studied in systems using multiple parallel channels. These ARQ schemes, however, fail to incorporate ARQ considerations with channel coding.

As discussed above, existing anti-jamming coding techniques for cognitive radio systems fail to incorporate retransmission protocols. Thus, a need exists for effective anti-jamming coding methods and systems including retransmission protocols to address inherent information loss resulting from packet non-recovery due to interference from primary users or other transmission interference sources.

SUMMARY

In accordance with aspects of the present principles, anti-jamming coding schemes with retransmission protocols may be designed to provide efficient throughput and reduce information loss and average delay. Short codes based on code graphs and residual code graphs, for example, may be selected such that the probability of packet loss is minimized by utilizing a jamming rate and the number of packets that are un-recovered. In this way, the short codes may be optimized for retransmission and employed to encode the un-recovered packets. Furthermore, according to another aspect of the present principles, rateless encoding features may be employed in a retransmission process to enhance throughput performance.

In one implementation of the present principles, a method for retransmitting information in accordance with a cognitive radio, anti-jamming coding scheme includes receiving an indication of un-recovered packets; determining that a first code graph including a representation of code bits within un-recovered packets has a minimum bit error probability by employing a jamming rate and a total number of packets that are un-recovered through decoding; encoding at least one of the un-recovered packets by applying a code based on the first code graph; and retransmitting at least one encoded un-recovered packet.

In an alternate implementation of the present principles, a system for retransmitting information in accordance with a cognitive radio, anti-jamming coding scheme includes a code designing module configured to receive an indication of un-recovered packets and configured to determine that a first code graph including a representation of code bits within un-recovered packets has a minimum bit error probability by employing a jamming rate and a total number of packets that are un-recovered through decoding; and an encoder configured to encode at least one of the un-recovered packets by applying a code based on the first code graph for retransmission of un-recovered packets.

In another implementation of the present principles, a method for retransmitting information in accordance with a cognitive radio, anti-jamming rateless encoding scheme includes receiving an indication that an information sequence included within transmitted information packets is un-recovered through decoding; generating additional parity bits from the un-recovered information sequence in accordance with a rateless encoding scheme in response to receiving the indication; and transmitting the additional parity bits.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

The present principles advantageously provide methods and systems for retransmitting information in accordance with a cognitive radio, anti-jamming coding scheme. Although the present principles are described primarily within the context of piecewise coding schemes and rateless coding schemes, the specific implementations of the present principles should not be treated as limiting the scope of the invention. It will be appreciated by those skilled in the art and informed by the teachings of the present disclosure that the concepts of the present principles may be advantageously applied in other implementations.

Figure 1:
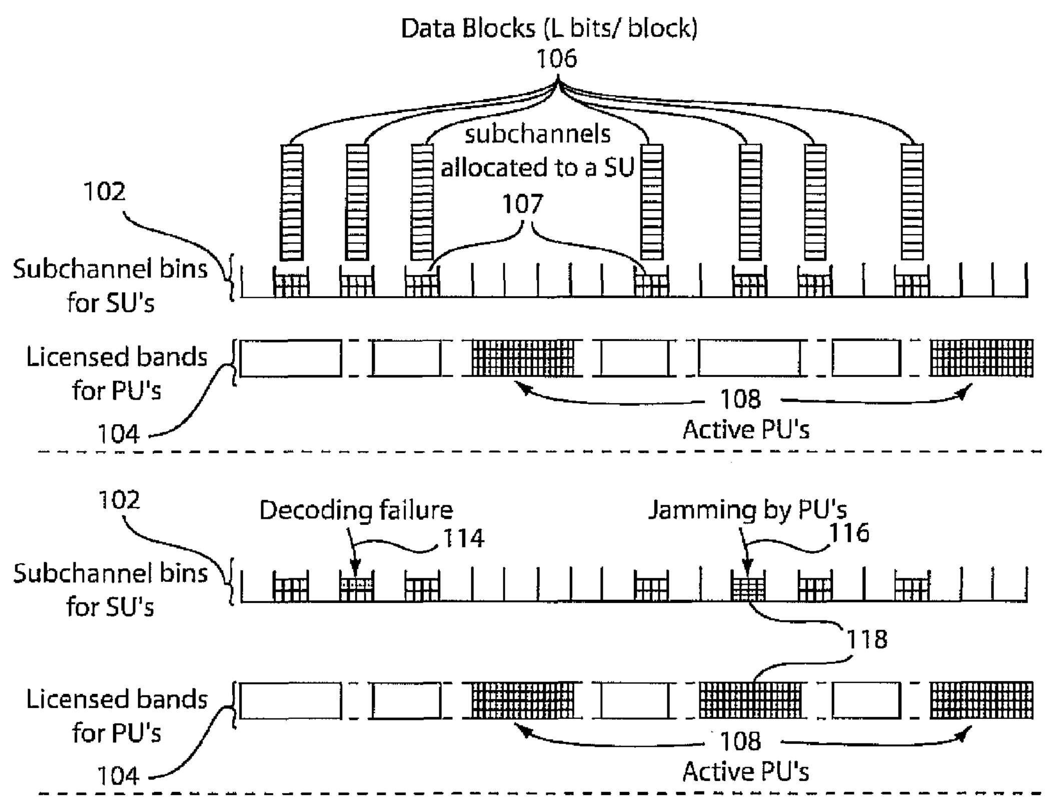
FIG. 1 depicts a high-level block diagram illustrating a cognitive radio system model.

Referring now in detail to the figures in which like numerals represent the same or similar elements and initially to FIG. 1, a cognitive radio system model for secondary usage is illustrated. As shown in the upper part of FIG. 1, channels available to a secondary user are divided into a large number of parallel subchannel bins 102 that form a spectrum pool. Although the whole spectrum depicted 104 is licensed to primary users, some subchannels 107 not utilized by a primary user are available to secondary users, as discussed above. In this example, data blocks 106 including L bits per block are transmitted along subchannels 107, as shown. Available subchannels may be identified by automatic sensing devices, as stated above, and may be allocated to different secondary users based on an opportunistic spectrum assignment scheme.

To reduce any burst interference from channels 108 employed by primary users, the subchannels selected for one particular secondary user may be scattered throughout the spectrum pool. Thus, for example, for a particular secondary user, only one subchannel from one licensed frequency band is selected. Therefore, as illustrated in the lower portion of FIG. 1, when one primary user abruptly becomes active on channel band 118 and jams one subchannel 116 within the band, only one subchannel out of the scattered selection for the secondary transmission is jammed. Besides the interference from primary users, other channel impairments, such as, deep fading, for example, may also cause decoding failure and lead to packet loss. A decoding failure on subchannel 114 may be due to such channel impairments.

The total jamming rate, p, for the cognitive radio system model described above is given by $$p \triangleq p_{PU} + p_a, \tag{1}$$

where $p_{pu}$ is the jamming probability from primary users and $p_a$ is the probability of a decoding failure. It is assumed here that a jamming event is independent and identically distributed (i.i.d.) for all subchannels. Further, in the exemplary implementations described below, a secondary user is assigned with K subchannels and one length-L binary sequence per subchannel at one time frame. When anti-jamming coding is applied, additional M subchannels are allocated to this secondary user for transmitting redundancy information. Thus, a total of N blocks of data sequences form one data frame, where $N=K+M$.

Utilizing the cognitive radio model described with respect to FIG. 1, two anti-jamming coding techniques for reliable transmissions in cognitive radio systems, namely, rateless coding and piecewise coding are described below. Both coding schemes have low-complexity encoding/decoding processes and provide high throughput and small redundancy. The piecewise coding scheme incorporating the designed short codes in accordance with aspects of the present principles provides enhanced performance with less overhead than existing cognitive radio coding systems for a moderate jamming rate.

The designs of retransmission protocols for both anti-jamming coding techniques provided below further improve average throughput for secondary users. For example, one retransmission method for piecewise coding selectively repeats and re-encodes information packets using systematic codes. The design of systematic codes for the piecewise coding retransmission method is adapted to minimize the bit-error-rate (BER). In accordance with other exemplary implementations of the present principles, a deterministic, rateless coding retransmission protocol with two fixed settings for subchannel allocations is described below. Incorporating retransmission schemes in accordance with aspects of the present principles within either anti-jamming coding technique improves throughput significantly.

Anti-Jamming Coding Schemes

Exemplary anti-jamming coding schemes that may be employed by various implementations of the present principles are described herein below.

Anti-Jamming Piecewise Coding

Figure 2:
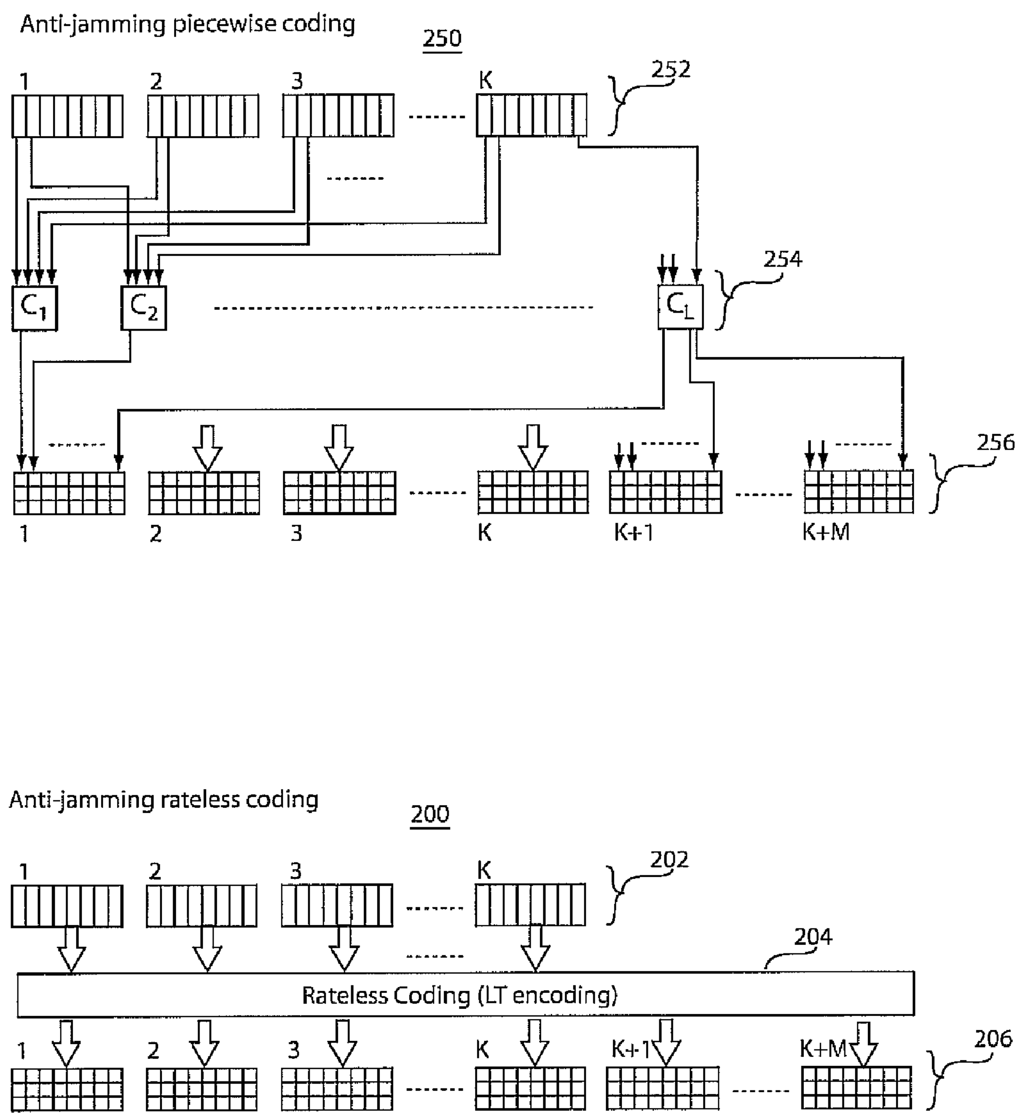
FIG. 2 depicts a high-level block diagram illustrating anti-jamming rateless and piecewise coding techniques.

Referring now to FIG. 2, depicting a high level block/flow diagram illustrating an anti-jamming piecewise coding scheme 250 including erasure coding aspects, given K blocks of length-L data sequences 252, all the ith bits from K information blocks are selected and encoded using an (N, K) short block code $C_i$ or short codes $C_1$-$C_L$ 254, where the (N, K) short block codes each have N coded bits. After obtaining a total of L codewords, each of length N, one bit per codeword is again selected to form one block of a length-L coded sequence. N blocks 256 of coded sequences are obtained and transmitted through N subchannels. The N blocks 256 are composed of K information packets and M parity packets. To reduce complexity, the same code C is used in this exemplary implementation for all L codes. However, it should be understood that short codes 254 may be comprised of one or more different codes. In addition, a message-passing algorithm in the decoder may be employed to achieve low-complexity decoding. The short code for anti-jamming piecewise coding may be designed to achieve optimal error correction performance, as discussed below.

Anti-Jamming Rateless Coding

With continuing reference to FIG. 2, depicting a high level block/flow diagram illustrating an exemplary anti-jamming rateless coding scheme 200, all K blocks of information sequences 202 may be combined into a long sequence in either a random or a systematic way. Further, all KL message bits may be encoded using Luby-Transform (LT) rateless codes 204. The output parity bits from LT encoding may be formed into N blocks 206 of coded bits and transmitted through N subchannels. At the receiver, a decoder may recover all KL information bits from collected $N_{rec}$ blocks of data sequences, where $K \leqq N_{rec} \leqq N$, using an iterative message-passing decoding algorithm. Additionally, the robust Soliton distribution may be employed in the LT encoding.

Retransmission Protocols for Piecewise Coding

Figure 3A:
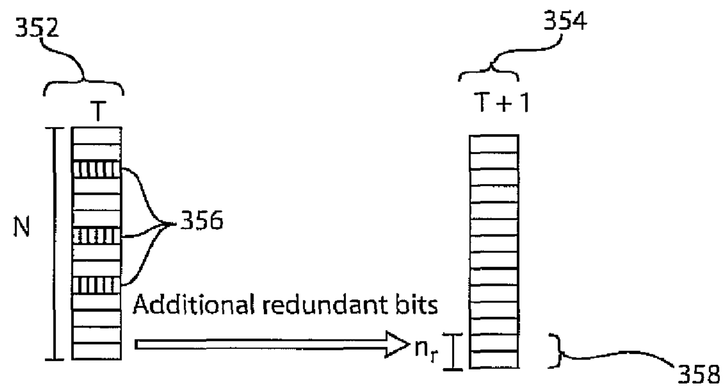
FIG. 3 depicts a high-level block diagram illustrating exemplary retransmission schemes in accordance with aspects of the present principles.
Figure 3B:
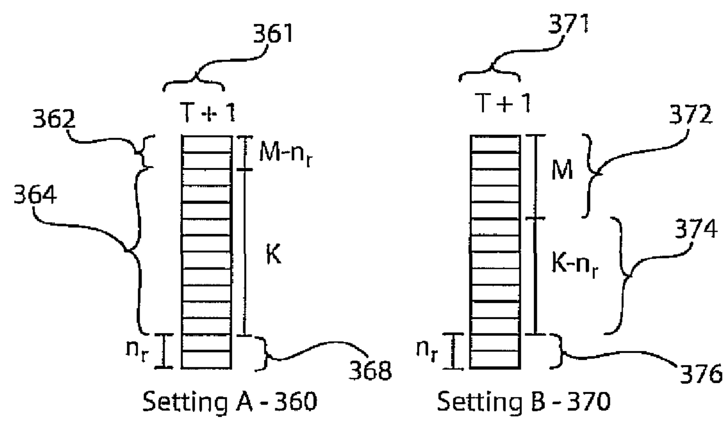
Figure 3C:
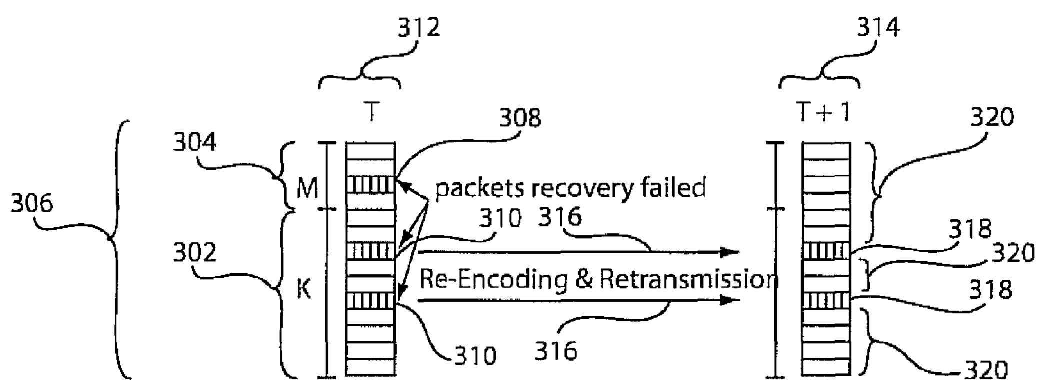

With reference to FIG. 3C, retransmission protocols in accordance with aspects of the present principles implemented using piecewise anti-jamming coding cognitive radio schemes for secondary users is illustrated. For the sake of brevity, the exemplary design of the retransmission protocols for anti-jamming piecewise coding described below employ a systematic code for a short code C. Here, for simplicity, K blocks 302 of information sequences and M blocks 304 of parity information are embedded in N blocks 306 of coded bits. In accordance with one implementation of the present principles, with systematic codes, if any lost packets 308 and 310 transmitted at transmission T 312 cannot be recovered by anti-jamming piecewise codes by employing erasure coding aspects, only lost information packets 310 are re-encoded and retransmitted 316 at transmission T+1 314 as opposed to retransmitting all KL bits.

As shown in FIG. 3C, encoded un-recovered packets 318 may be retransmitted through channels in parallel with new packets 320 that succeed originally transmitted packets 310 corresponding to the encoded un-recovered packets 318 in a transmission queue. The un-recovered, re-encoded information packets 318 corresponding to packets 310 are retransmitted with subsequent information packets 320 using systematic code C for the next transmission T+1 314. In addition, as discussed below, lost parity packets 308 need not be transmitted.

Although systematic codes are used for transmission, iterative decoding on a designed code graph, which is described below, may still be performed if the systematic code is appropriately adapted. For example, a systematic irregular repeat accumulate (IRA) code may be employed.

Figure 4:
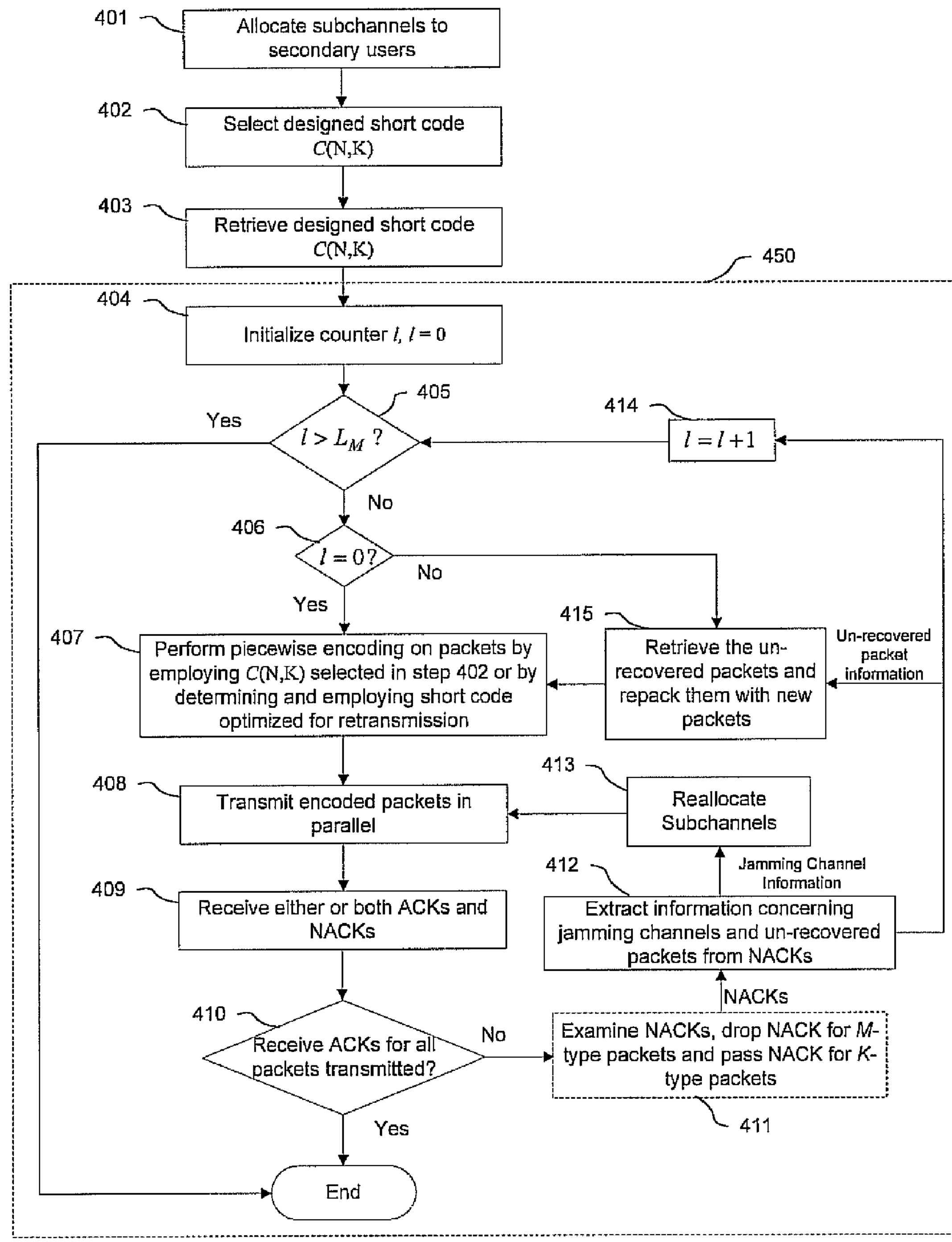
FIG. 4 depicts a high-level block/flow diagram illustrating an exemplary method for retransmitting un-recovered packets based on a piecewise encoding, anti-jamming/cognitive radio technique.

Referring now to FIG. 4, a method 400 for retransmitting information in accordance with a cognitive radio, anti-jamming coding scheme in accordance with one or more different implementations of the present principles is illustrated. In method 400, the retransmission process is incorporated within a piecewise coding scheme, which is described in more detail below. Method 400 may begin at step 401 in which subchannels are allocated to secondary users, as discussed above. Based on spectrum sensing, for example, a certain number of subchannels are determined to be available for secondary usage. As stated above, for simplicity purposes, N subchannels are allocated to one secondary user to transmit K packets of length-L each. The N-K subchannels are allocated for redundancy packets M.

At step 402, a designed C(N, K) code, referred to above as C, is selected based on the parameters of M, N and the jamming rate.

At step 403, the designed short codes may be retrieved from a memory device storing the short codes. The process for designing and determining short codes are discussed more fully below.

The retransmission process is depicted within block 450 and may begin at step 404, in which a transmission counter may be initialized by setting counter l to zero.

At step 405, it is determined whether l is greater than a maximum number of transmissions for a packet, $L_m$. If l is greater than $L_m$, indicating that a timeout has occurred, then the retransmission process may be stopped. Otherwise, the process may continue to step 406.

At step 406, it is determined whether l is zero. If l is zero, then the packets are being transmitted for the first time and step 407 is performed. If l is not zero, then step 415 is performed, as discussed below.

At step 407, a block of packets N may be piecewise encoded using the designed (N, K) code selected step 402. In addition, at step 407, for the retransmission of un-recovered packets, a design code optimized for retransmission may be determined based on a jamming rate and the number of packets that are un-recovered to minimized error probability and maximize throughput, as discussed below. After the design code for retransmission is selected, the un-recovered packets may be piecewise encoded for retransmission. Piecewise coding is described below. Further, as mentioned below with respect to step 415, the un-recovered packets may be encoded with new packets in accordance with the optimized short code. It should be noted that for the first transmission, in which l is zero, all new packets in a transmission queue are encoded.

At step 408, coded N packets may be transmitted in parallel through N subchannels as discussed above with respect to FIG. 1. The N subchannels transmitted may be those allocated in step 401 or step 413, discussed below.

At step 409, messages may be received from a receiver comprising either or both packet acknowledgements (ACK) and negative packet acknowledgements (NACK).

At step 410, it is determined whether packet ACKs for all information packets transmitted through one transmission pass have been received from a receiver. A transmission pass corresponds to a transmission instant T at which a block of packets, such as N, is transmitted in parallel as discussed above with respect to FIG. 1. If packet ACKs have been received for all information packets transmitted in one pass, then the retransmission process may end. If at least one negative packet acknowledgement (NACK) has been received for at least one information packet from a receiver, then the process may continue to steps 411 or 412. A NACK may indicate that a packet has not been recovered as a result of anti-jamming piecewise decoding by employing erasure coding aspects. Thus, in this way, a NACK may indicate packets that were un-recovered through decoding. Alternatively, in other implementations, the NACK may indicate that a packet has not been received by a receiver.

At step 411, it may optionally be determined whether NACKs indicate information packets K or parity packets X have been un-recovered or un-received. In other words, it may be determine whether un-recovered packets are parity packets or information packets. Furthermore, at step 411, the information related to M packets may be filtered such that only NACKs related to information packets K is further processed. In this way, only un-recovered information packets may be retransmitted.

At step 412, feedback concerning jamming channels and un-recovered packets may be extracted from the received NACKs and employed in steps 413 and 415, respectively, as discussed below.

At step 413, sub-channels may be reallocated for use in parallel transmission step 408 in the next transmission pass by employing jamming information extracted from NACKs in step 412. For example, alternate sub-channels may be allocated for secondary usage to avoid jamming channels employed by primary users, as discussed above.

At step 414, l may be increased by one by the counter to permit monitoring of the number of transmissions. Thereafter, steps 405 and 406 may be performed, as discussed above. As stated above with respect to step 406, if l is determined to be a value that is not zero, step 415 may be performed. An l greater than zero indicates that un-recovered packets are retransmitted in the transmission pass.

At step 415, the feedback concerning un-recovered packets extracted in step 412, which may include packet identifiers, is employed to retrieve the un-recovered packets and repack them with subsequent, new packets in the transmission queue. The repacked information packets may thereafter be sent to an encoder for piecewise encoding in step 407, as discussed above.

Returning to step 407, in accordance with aspects of the present principles, if un-recovered packets are re-packed during the transmission pass, the packets are re-encoded with one or more designed short codes (N, K) that are optimized for retransmission to enable efficient throughput and reduce information loss and average delay. As discussed in more detail below, one or more short codes may be selected in a way that minimizes the probability of packet loss.

Subsequent to re-encoding, steps 409 and 410 may be performed, as stated above. Method steps 405-415 may be repeated and the process may continue until ACKs for the un-recovered packets or ACKs for all information packets transmitted through one transmission pass have been recovered by a receiver. Additionally, the process may continue until a timeout occurs.

Short Code Design

Referring again to step 407, as stated above, un-recovered packets may be re-encoded with one or more short codes that are optimized for retransmission. For example, the short code may be optimized so that the packet error probability is minimized, as discussed below.

Here, N blocks of data sequences carrying K information packets transmitted through N parallel subchannels are considered. The number of lost or un-recovered packets after decoding at the physical layer is denoted as n. Assuming that the total jamming rate is p, the probability of losing n packets, $P_n^{(N)}(p)$ or the packet error probability is given by $$P_n^{(N)}(p) = \binom{N}{n} p^n (1-p)^{N-n},\ n = 0, 1, \ldots\ , N \tag{2}$$

In piecewise coding, each packet transmitted through one particular subchannel is actually a bit node in the short code C. Thus, the packet error probability is the bit error rate (BER) of the code C in the erasure channels under iterative decoding. In addition, the packet error probability is distinguished from a frame error rate for the whole sequence through N subchannels.

The packet error probability is given by $$P_b = \sum_{n=M+1}^{N} \frac{n}{N} P_n^{(N)} + \sum_{n=0}^{M} \sum_{\varepsilon} Pr(\varepsilon \mid n) P_n^{(N)} \frac{n_a(\varepsilon)}{N}, \tag{3}$$

where $\epsilon$ denotes a decoding error event, $Pr(\epsilon|n)$ is the probability of a particular decoding error event given a number of lost packets n, and $n_a(\epsilon)$ denotes or equals the total number of un-recovered packets from the decoding error event. In other words, $n_a(\epsilon)$ the number of un-recovered packets, may be the number of packets un-recovered through decoding. As stated above, the number of un-recovered packets may equal the number of packets that have not been recovered as a result of anti-jamming piecewise decoding by employing erasure coding aspects. Furthermore, the number of un-recovered packets may correspond to the number of packets un-recovered through one transmission pass. Additionally, in equation 3, the error probability $P_n^{(N)}$ obtained from equation 2 is a function of the jamming rate p. For simplicity, the notation p in $P_n^{(N)}(p)$ is dropped hereinafter.

Based on the renew-reward theorem, the throughput of the anti-jamming coding with retransmissions may be obtained from the following $$\eta = \frac{E\{R\}}{E\{T\}}, \tag{4}$$

where R is a random reward representing the transmitted information packets after the retransmission process stops as a result of successful decoding or timeout. Further T denotes the random transmission time for two consecutive occurrences of the recurrent event, which may be referred to as the inter-renewal time. The inter-renewal time may correspond to the transmitted block length between two new transmission processes. Here, as discussed below, the reward R may alternatively be defined as the number of information packets transmitted and the cost T may alternatively be defined as the number of resources or subchannels used. Thus, the throughput defined here is actually similar to the throughput efficiency. It is clear that $\eta \leqq 1$.

In accordance with aspects of the present principles, as discussed above, a retransmission process incorporated with piecewise coding may include re-packing un-recovered information packets with subsequent information packets for transmission in the next time slot. Therefore, in the retransmission slot, there are both old packets and new packets. The number of old packets and the number of new packets in the retransmission block may depend on the decoding output from the previous transmission. Thus, it may be difficult to analyze throughput based on such a retransmission process directly. However, an equivalent transmission model is proposed below to evaluate the throughput of the retransmission method described above.

For purposes of calculating throughput, as opposed to considering detailed decoding outputs and all retransmission scenarios, the un-recovered information packets may be treated as lost packets that are not retransmitted. In addition, for purposes of calculating throughput, the retransmission of those lost information packets may be treated as the transmission of new packets. Thus, in the subsequent block, and in every transmission block, all transmitted information packets are considered to be new information packets. Because the jamming may be assumed to be i.i.d. among all subchannels and all transmission blocks, with the equivalent model discussed herein, the throughput from one transmission block may be obtained by $$\eta = \frac{E\{K_{suc}\}}{E\{N_{tr}\}} = \frac{E\{K(1-P_b(p))\}}{N}, \tag{5}$$

where $K_{suc}$ denotes the successfully transmitted information packets and $N_{tr}$ denotes the resources used for transmitting $K_{suc}$ information packets. For a constant jamming rate p, we have $$\eta = \frac{K}{N}(1-P_b) \tag{6}$$

where $P_b$ is given by equation 3. Accordingly, the throughput for anti-jamming piecewise coding incorporating the retransmission method discussed above may be maximized by designing a short code having a minimum bit error probability $P_{b_{min}}$.

To achieve optimal throughput performance with piecewise coding incorporating retransmission protocols, the short code C may be designed to have a minimum bit error rate $P_b$ under iterative decoding. A code graph representation $\mathcal{L}$ and residual graph representation S, defined below, may be employed to optimize the short code. Because the first term in equation 3 does not depend on the code graph, the code design may be summarized as $$\min_{\mathcal{L}} P_b(\mathcal{L}) = \min_{\mathcal{L}} \sum_{n=1}^{M} P_n^{(N)} \sum_{\varepsilon} n_a(\varepsilon) Pr(\varepsilon \mid n). \tag{7}$$

Figure 12:
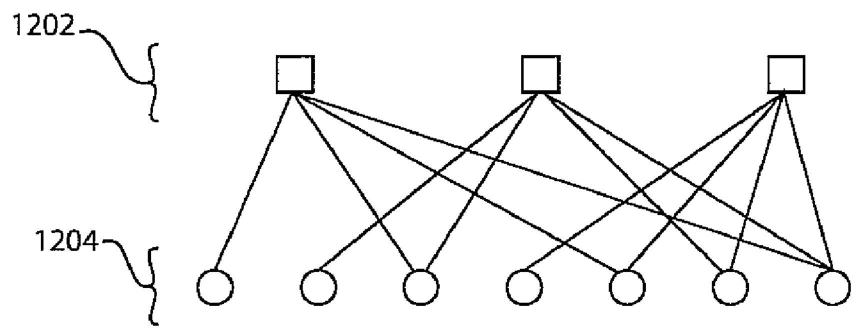
FIG. 12 depicts an exemplary bipartite graph for a linear block code corresponding to a specific parity-check matrix in accordance with aspects of the present principles.

With reference to FIG. 12, regarding code graph representations and residual graphs, a linear block code with parity check matrix H may be represented by a Tanner graph or a bipartite graph, wherein variable nodes represent the code bits and check codes represent the parity-check constraints. In a Tanner Graph or Bipartite code graph representation in accordance with one or more implementations of the present principles, an edge in the graph is placed between a variable node i and a check node m if $H_{mi}=1$. In addition, no parallel edges are placed between a variable node and a check node. In other words, only one or no edges are placed between any variable node/check node pair. Each check node is connected to code bits whose sum modulo-2 is zero. FIG. 12 illustrates an exemplary associated bipartite graph 1200 with check nodes 1202 and variable nodes 1204 for a (7, 4) code with the following parity check matrix:

$$H = \begin{bmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix}$$

Figure 13:
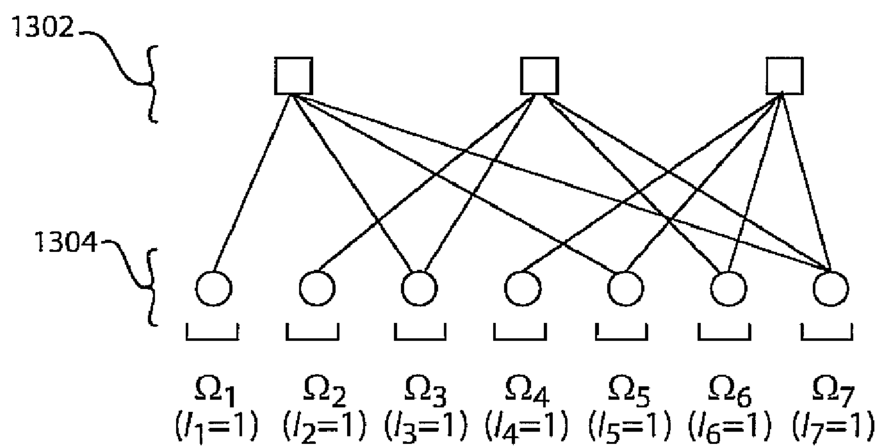
FIG. 13 depicts an exemplary code graph that is represented by a cardinality set in accordance with aspects of the present principles.

Referring now to FIG. 13, in accordance with one or more implementations of the present principles, all the variable nodes may be grouped into $2^M-1$ sets. A variable node i belongs to the set $\Omega_j$, $j=1, \ldots, 2^M-1$, if $$j = \sum_{m=1}^{M} 2^{m-1} H_{mi}. \tag{8}$$

Therefore, the code can be represented by the set $\mathcal{L}_M=\{l_j, j=1, \ldots, 2^M-1\}$, where $l_j$ denotes the cardinality of set $\Omega_j$, i.e., $l_j=|\Omega_j|$. Thus, the code graph can be represented by a cardinality set with $2^M-1$ elements. Additionally, $\Sigma_j l_j=N$. As stated above, M may correspond to the number of parity packets transmitted in one transmission pass. FIG. 13 shows an exemplary bipartite graph 1300 including check nodes 1302 and variable nodes $\Omega_1$-$\Omega_7$ 1304 corresponding to $l_1$-$l_7$, respectively, each of which is equal to 1. In graph 1300, the (7,4) code referred to with respect to FIG. 12 is represented by the set $\mathcal{L}_3=\{1,1,1,1,1,1,1\}$.

The residual graph S may be specified by the erasure nodes that cannot be recovered in the code graph under iterative decoding. The set $\Theta_j$ may be defined as follows:

$$\Theta_j \triangleq \{\text{residual erasure node } i : i \in \Omega_j\}.$$

Additionally, $s_j=|\Theta_j|$. Similarly, as $\mathcal{L}_M$ specifies the code graph, the set $$S_{M,n} \triangleq \{s_j,\ j=1, \ldots, 2^M-1\}$$

may be defined as the residual graph of n erasure nodes for M check nodes with $\Sigma_j s_j=n_r$, where $n_r$ is the total number of residual erasures after iterative decoding, with $0<n_r\leqq n$.

Examination of the definition of code graph $\mathcal{L}_M$ reveals that the design of short codes should be considered with a small M because the number of elements $s_j$ increases exponentially as M increases. Fortunately, one important objective of the code design for anti-jamming coding is small redundancy. Therefore, the design methodology described herein is effective. The code design for small M is presented in detail below.

For M=1, there is only one solution $\mathcal{L}_1^*=\{l_1=N\}$. Here, all the parity bits are connected to the only parity check node, which may be referred to as the single parity check (SPC) code. With this code graph, any single erasure may always be recovered with the SPC constraint. Accordingly, $Pr(E|n\leqq M)=0$. From equation 3, the packet error probability for anti-jamming piecewise coding with M=1 is given by $$P_b^{PW^1} = \sum_{n=M+1}^{N} \frac{n}{N} P_n^N. \tag{9}$$

This relation is general in that it may be applied to any code length N.

For M=2, the design of $\mathcal{L}_2=\{l_1,l_2,l_3\}$ is applied. When n=1, the erasure bit may be recovered as long as every variable node is connected to some check node. Therefore, $Pr(E|n=1)=0$. This result may be generalized to any M for n=1.

Figure 5:
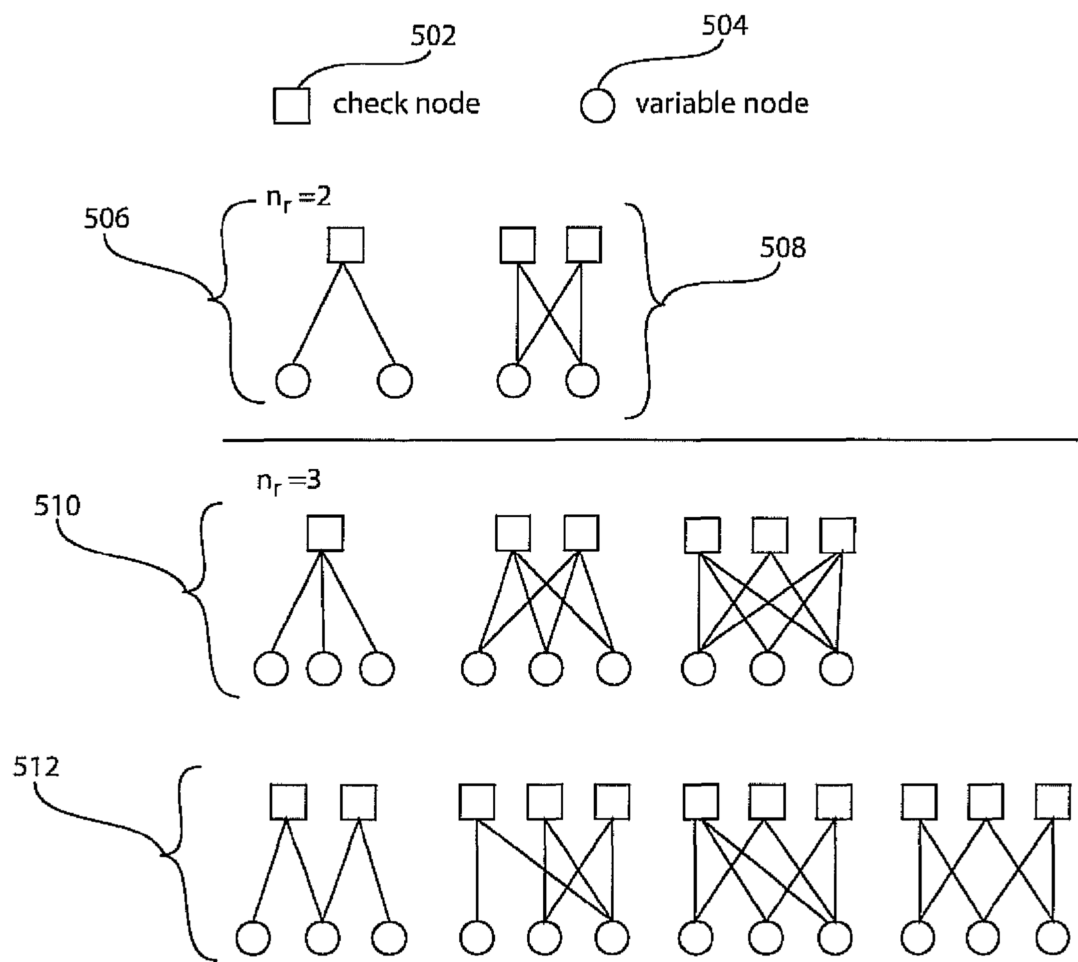
FIG. 5 depicts a high-level block diagram illustrating exemplary residual graph representations corresponding to various values of residual erasures after decoding.

Referring now to FIG. 5, residual graph representations including check nodes 502 and variable nodes 504 are depicted. If n=2, the residual graphs of type 506 and 508 for $n_r=2$ may, for example, not be decodable under iterative decoding. Such residual graphs may be represented by $\{s_j=2, s_{j'\neq j}=0\}$, wherein two erasure nodes belong to the same set $\Omega_j$. The number of undecodable packets is then $n_a(\epsilon)=n_r=2$. For a given code $\{l_j\}$, the number of residual graphs with two erasures included in this code is given by $$\sum_j \binom{l_j}{2}.$$

It should be understood that the notation $$\binom{l}{s}$$

includes $$\binom{l}{s} = 0 \text{ if } l < s.$$

Thus, the error probability for n=2, is given by $$\begin{aligned} Pr(E, n=2) &= Pr(E \mid n=2) P_2^{(N)} \\ &= \sum_{\varepsilon} Pr(\varepsilon \mid n=2) P_2^{(N)} \\ &= \sum_{j=1}^{2^M-1} \binom{l_j}{2} \Big/ \binom{N}{2} P_2^{(N)} \\ &= \frac{P_2^{(N)}\left(\sum_{j=1}^{3} l_j^2 - N\right)}{N(N-1)} \end{aligned} \tag{10}$$

As mentioned above, only the second term in equation 3 depends on the code graph. Because Pr(E|n=1)=0 and $n_a(\epsilon)=2$, which is a constant for all undecodable errors, minimizing the error probability in equation 10 is equivalent to $$\min_{\{l_j\}} \sum_j l_j^2 \text{ s.t. } \sum_j l_j = N. \tag{11}$$

The solution of above optimization problem for integer sets $\{l_j\}$ is $l_j=\lfloor N/3 \rfloor$ or $\lceil N/3 \rceil$, with $$\sum_{j=1}^{3} l_j = N.$$

Here, for M=2, the solution is the same as that for minimizing the frame error rate, as the optimization problem does not depend on any channel conditions. It is also a general expression for any N. The packet error probability for M=2 is therefore given by $$P_b^{PW^2} = \sum_{n=M+1}^{N} \frac{n}{N} P_n^{(N)} + \frac{P_2^{(N)}\left(\sum_j l_j^2 - N\right)}{N(N-1)} \frac{2}{N}. \tag{12}$$

For M=3, the design of $\mathcal{L}_3=\{l_j\}_{j=1}^{7}$ is considered. The error probabilities for n≦M is discussed first. If n=1, $Pr(E|n=1)=0$. If n=2, similarly, as discussed above, $$Pr(E, n=2) = P_w^{(N)} \frac{\sum_{j=1}^{7} l_j^2 - N}{N(N-1)}. \tag{13}$$

If n=3, more residual graphs are examined as follows.

(1) In a first type of residual graphs in which n=3, all the residual graphs include the residual graph with $n_r=2$ where two erasures are in the same set $\Omega_j$, combined with one more erasure in the set $\Omega_{j',j'\neq j}$. The number of such error events for n=3 with a given code $\{l_j\}$ is then $$\sum_j \sum_{k\neq j} \binom{l_j}{2} l_k.$$

Different error events and the number of error bits $n_a$ are listed below.

(a) For j=7, $n_a=3$ for all k,k≠j.

(b) For j=3, $n_a=3$ for k=1 or k=2, $n_a=2$ for any other k.

(c) For j=5, $n_a=3$ for k=1 or k=4, $n_a=2$ for any other k.

(d) For j=6, $n_a=3$ for k=2 or k=4, $n_a=2$ for any other k.

(e) For all other cases, $n_a=2$.

Herein, $\mathcal{V}_2$ is denoted as the set of above-recited cases of {j,k} with $n_a(\epsilon)=2$ and $\mathcal{V}_3$ is denoted as the set of {j,k} with $n_a(\epsilon)=3$.

(2) A second type of residual graphs have all three erasures in the same set $\Theta_j$, as illustrated in the set of graphs 510 of FIG. 5 for $n_r=3$. The residual graphs may be represented by $\{s_j=3, s_{j'\neq j}=0\}$ with the total number of residual graphs being $$\sum_j \binom{l_j}{3}$$

for a given code $\{l_j\}$. For second type of residual graphs, $n_a(\epsilon)=3$.

(3) A third type of residual graphs are depicted in the set of graphs 512 of FIG. 5, which may be summarized by the set $\mathcal{U}$, which is the set of indices of $\Omega_j$ to which the three nodes belong. Accordingly, $$\mathcal{U}=\{(1,2,3),(1,4,5),(2,4,6),(1,6,7),(2,6,7),(4,6,7),(3,5,7),(3,6,7),(5,6,7),(3,5,6)\}.$$

The packet error probability for n=3 is therefore $$P_b(n=3)=P_3^{(N)}\binom{N}{3}^{-1}\left(\left[\sum_{\{j,k\}\in\mathcal{V}_3}\binom{l_j}{2}l_k+\sum_{j=1}^{7}\binom{l_j}{3}+\sum_{(j_1,j_2,j_3)\in\mathcal{U}}l_{j_1}l_{j_2}l_{j_3}\right]\frac{3}{N}+\sum_{\{j,k\}\in\mathcal{V}_2}\binom{l_j}{2}l_k\frac{2}{N}\right). \quad (14)$$

Thus, the total packet error probability for M=3, given by $$P_b^{PW3}=\sum_{n=M+1}^{N}\frac{n}{N}P_n^{(N)}+P_2^{(N)}\frac{2}{N}\frac{\sum_{j=1}^{7}l_j^2-N}{N(N-1)}+P_3^{(N)}\binom{N}{3}^{-1}\left[\sum_{\{j,k\}\in\mathcal{V}_3}\binom{l_j}{2}l_k+\sum_{j=1}^{7}\binom{l_j}{3}+\sum_{(j_1,j_2,j_3)\in\mathcal{U}}l_{j_1}l_{j_2}l_{j_3}\right]\frac{3}{N}+P_3^{(N)}\binom{N}{3}^{-1}\sum_{\{j,k\}\in\mathcal{V}_2}\binom{l_j}{2}l_k\frac{2}{N}. \quad (15)$$

Accordingly, the code design for M=3 may be summarized as $$\min_{\{l_j\}}P_b^{PW3}\ \text{s.t.}\ \sum_{j=1}^{7}l_j=N. \quad (16)$$

Here, the optimum $\mathcal{L}_3^*$ for M=3 is not a universal solution, as it depends on the code length N and the jamming rate p. Given N and p, an exhaustive search for the optimum code graph $\mathcal{L}_3^*$ should be performed, as discussed more fully below.

For other values of M, code graphs may be designed in a manner and with the same considerations described with respect to the M=3 case. However, due to the considerable number of all possible residual graphs, it may be advantageous to obtain all the residual graphs and the corresponding number of unrecoverable bits numerically.

With reference to Table 1, the total number of residual graphs for different number of erasures n and the number of residual graphs with a particular number of unrecoverable packets $n_a$, which also corresponds to the number of unrecovered (N, K) short coded bits, for M=4 is listed. With all residual graphs, the codes for M=4 may be designed by employing equation 7. However, as illustrated by Table 1, compared with the residual graphs for M=3, the number of residual graphs for M=4 increases substantially for increasing n and $n_a$. Despite the number of residual graphs, optimal codes with small N may be designed by conducting an exhaustive search for the optimal code graph.

TABLE 1

| No. of Erasures | $n_a = 2$ | $n_a = 3$ | $n_a = 4$ | No. of Residual Graphs |
|---|---|---|---|---|
| n = 2 | 15 | | | 15 |
| n = 3 | 160 | 134 | | 294 |
| n = 4 | 624 | 792 | 1101 | 2517 |

Referring now to Table 2, provided below, the total number of residual graphs for different number of erasures n and the number of residual graphs with a particular number of unrecoverable bits $n_a$ for M=5 is listed. As illustrated by Table 2, similar to the M=4 case, the total number of residual graphs increases significantly for increasing n and $n_a$. For n=5, the number of residual graphs is 295,351. With such a large amount of residual graphs, and even more code graphs, it is difficult to obtain the optimal results for N>10. The following approximation approach may be employed to design the short code for M=4 and M=5:

For small N, e.g., N≦0, an exhaustive search may be conducted to find the optimal code graph $\mathcal{L}_M^*(N)$.

For larger N, e.g., N>10, the following approximation method may be utilized to determine an optimal code graph for larger N. Using the designed code graph for a code length N, $\mathcal{L}_M^*(N)=\{l^*_j(N)\}$, suboptimal codes corresponding to a subset of all code graphs for code length N+1 are obtained by perturbing an optimal set $\mathcal{L}_M^*(N)$ for the length-N code with a degree u, given by $$\{l^*_j(N)-u\leqq l_j\leqq l^*_j(N)+u+1\} \quad (17)$$

with $$\sum_{j=1}^{2^M-1}l_j=N+1.$$

Thereafter, the optimal code graph $\mathcal{L}_M^*(N+1)$ for code length N+1 may be obtained by searching the subset, as discused above. As described below, the process may be performed iteratively until a desired code length N is reached.

The complexity for the above-recited approximation method depends on the perturbation degree u. Increasing the values of u improves results at the expense of higher complexity. For M=4, the resulting optimal codes are reasonably sufficient even if a value of u=1 is employed.

TABLE 2

| No. of Erasures | $n_a = 2$ | $n_a = 3$ | $n_a = 4$ | $n_a = 5$ | No. of Residual Graphs |
|---|---|---|---|---|---|
| n = 2 | 31 | | | | 31 |
| n = 3 | 750 | 621 | | | 1371 |
| n = 4 | 7380 | 8630 | 11876 | | 27886 |
| n = 5 | 31440 | 42420 | 79870 | 141621 | 295351 |

Although the above-recited approximation method may yield results within a reasonable time for the M=4 case, the approximation method may be difficult to apply to the M=5 case due to the large amount of residual graphs that are analyzed. As such, a second approximation method with less computation complexity in accordance with one or more implementations of the present principles is introduced below.

The second approximation method is similar in some aspects to the first approximation local search method. However, the optimal code graph representation obtained for a code of length N in the second approximation method is not dependent on the optimal code graph representation obtained for a code of length N−1. Algorithm 1, depicted in Table 3 below, illustrates one implementation of the second approximation method for determining short codes optimized for retransmission in a anti-jamming piecewise coding scheme. The method performed in accordance with Algorithm 1 is described more fully below with respect to method 900 of FIG. 9.

TABLE 3

| Algorithm 1 |
|---|
| For $i = 1, \ldots, 2^M - 1$ |
|     Let $l_j = 0, \forall j \neq i, l_i = N$. |
|     For $k = 1, \ldots, N$ |
|         $l_i \leftarrow l_i - 1$ |
|         Compute the $P_b(\mathcal{L}_j)$ |
|         where $\mathcal{L}_j \triangleq \{l_1, \ldots, l_{j-1}, l_j + 1, l_{j+1}, \ldots, l_{2^M-1}\}$, for |
|         $j = 1, \ldots, 2^M - 1$. Find $j^* = \mathrm{argmin}_j\, P_b(\mathcal{L}_j)$. |
|         $l_{j^*} \leftarrow l_{j^*} + 1$ |
|     Output the result $\mathcal{L}_i^* = \{l_1, \ldots, l_{2^M-1}\}$, |
| Determine and output $\mathcal{L}^* = \mathrm{argmin}_{\mathcal{L}_i^*} P_b(\mathcal{L}_i^*)$. |

Figure 6:
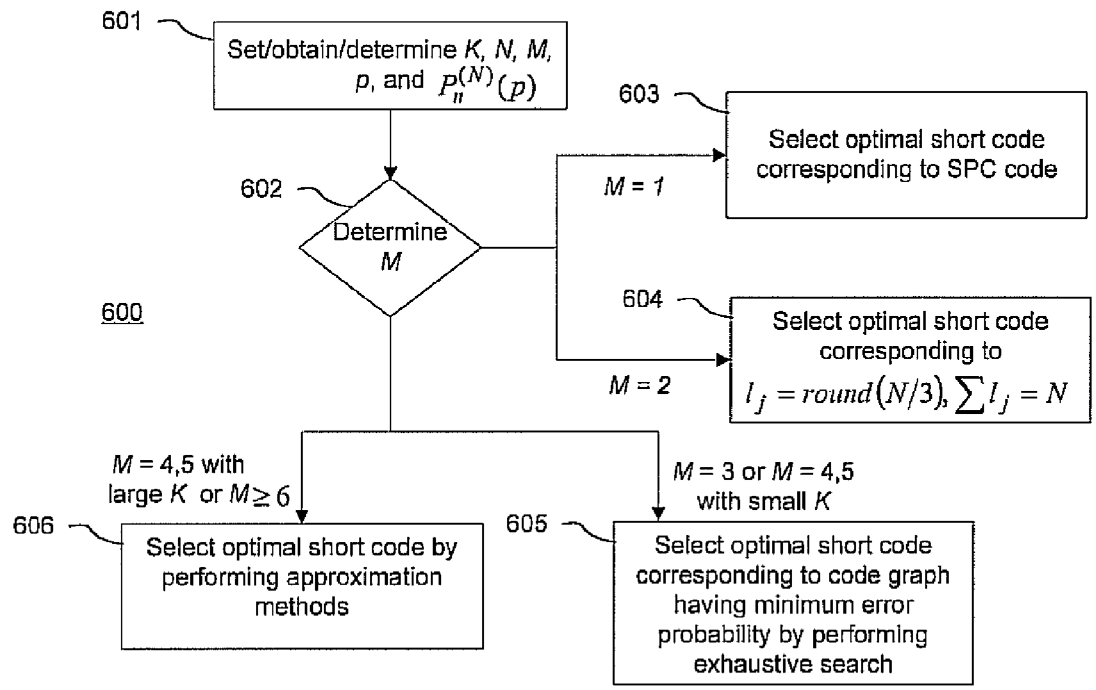
FIG. 6 depicts a high-level block/flow diagram illustrating an exemplary method for determining a short code optimized for retransmission and employed to encode un-recovered packets.

Referring now to FIG. 6 with continuing reference to FIG. 4, a high-level flow diagram illustrating one exemplary method implementation of the present principles 600 for determining optimal short codes or corresponding code graphs incorporating features discussed above is provided. For example, method 600 may be performed at step 407, wherein the optimal short codes are determined and employed to re-encode un-recovered packets for retransmission. Method 600 may begin at initialization step 601 in which information bits K, code word length N, parity bits $M=N-K$, jamming rate p, and $P_n^{(N)}(p)$ are set, obtained and/or determined. $P_n^{(N)}(p)$ may be determined by applying equation 2, $$P_n^{(N)}(p) = \binom{N}{n} p^n (1-p)^{N-n},\ n = 0, 1, \ldots, N,$$

as discussed above.

In accordance with method 600, depending on the value of M, different processes may be applied to determine a short code that is optimized for retransmission. At step 602, the value of M is determined.

If M=1, the process may proceed to step 603, wherein the codes corresponding to the single parity check codes are selected as optimal short codes to be employed for encoding. As discussed above, for M=1, $\mathcal{L}_1^* = \{l_1 = N\}$. The SPC codes may be employed for all N.

If M=2, the process may proceed to step 604, wherein the code corresponding to code graph $\mathcal{L}_2^* = \{l_j\}$, wherein $$l_j = \mathrm{round}\left(\frac{N}{3}\right),\ \sum l_j = N,$$

is selected as the optimal short code, as discussed above. Here, the code graph corresponding to the optimal short code has one third of variable nodes that are connected to one of the check nodes, another one third of variable nodes are connected to the other check node and the remaining one third of variable nodes are connected to both check nodes.

If M=3, or if M=4,5 with small K, the process may proceed to step 605, in which an exhaustive search is performed as discussed below with respect to method 700 to determine the optimal short code. Here "small K" may vary depending on the processing capacity employed to implement methods in accordance with aspects of the present principles. For example "small K" may correspond to $K \leqq 10$ or $K \leqq 4$ ($N \leqq 10$, as discussed above), K values between these two, or other K values.

For all other values of M, the process may proceed to step 606, in which approximation methods in accordance with either of methods 800 or 900, discussed below, are employed to determine the optimal short code.

Figure 7:
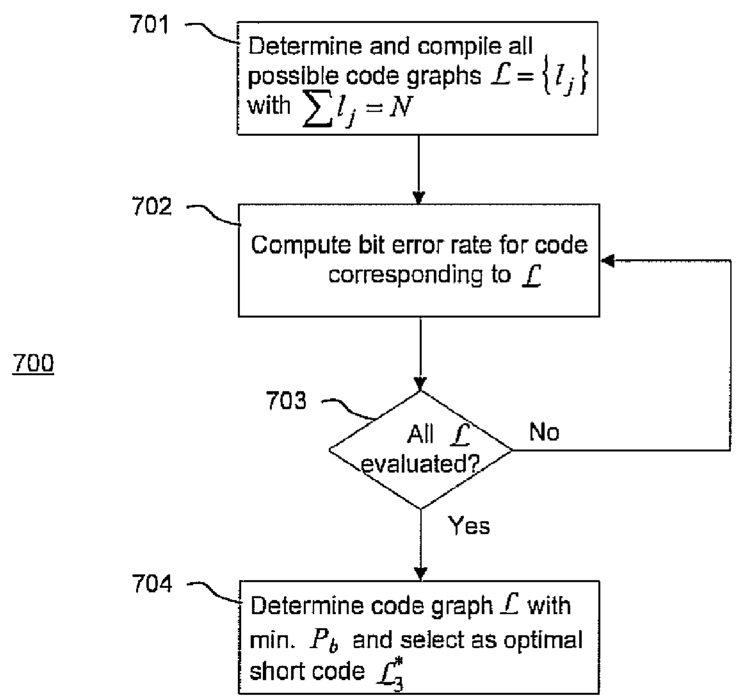
FIG. 7 depicts a high-level block/flow diagram illustrating an exemplary method for determining a short code optimized for retransmission by conducting an exhaustive search for a code graph corresponding to a minimum bit error rate based on a jamming rate and a number of un-recovered packets.

Referring now to FIG. 7 with continuing reference to FIG. 6, a high-level block/flow diagram depicting a method 700 for performing an exhaustive search for optimal short codes that may be employed in step 605 is illustrated. Method 700 may begin at step 701, in which all possible code graphs $\mathcal{L} = \{l_j\}$ with $\Sigma l_j = N$ are determined and compiled.

At step 702, the bit error rate for $\mathcal{L}$ may be determined by employing equation 3, $$\sum_{n=1}^{M} P_n^{(N)} \sum_{\varepsilon} n_a(\varepsilon) Pr(\varepsilon \mid n),$$

simply $$P_b = \sum_{n=M+1}^{N} \frac{n}{N} P_n^{(N)} + \sum_{n=0}^{M} \sum_{\varepsilon} Pr(\varepsilon \mid n) P_n^{(N)} \frac{n_a(\varepsilon)}{N}, \text{ or}$$

as discussed above. Here, the bit error rate for $\mathcal{L}$ in the jamming channels may be determined.

At step 703, it may be determined whether all $\mathcal{L}$ are evaluated. If not all $\mathcal{L}$ have been evaluated, the process may continue to step 702 in which the bit error rate for an unevaluated $\mathcal{L}$ is determined. If all $\mathcal{L}$ have been evaluated, the method may proceed to step 704.

At step 704, the code graph $\mathcal{L}$ with the minimum bit error rate $P_b$ is determined and selected as $\mathcal{L}_3^*$ by employing the following:

$$\min_{\mathcal{L}} P_b(\mathcal{L}) = \min_{\mathcal{L}} \sum_{n=1}^{M} P_n^{(N)} \sum_{\varepsilon} n_a(\varepsilon) Pr(\varepsilon \mid n),$$

as discussed above. The code corresponding to $\mathcal{L}_3^*$ is selected as the optimal short code and is employed to re-encode un-recovered packets for retransmission, as discussed above.

Figure 8:
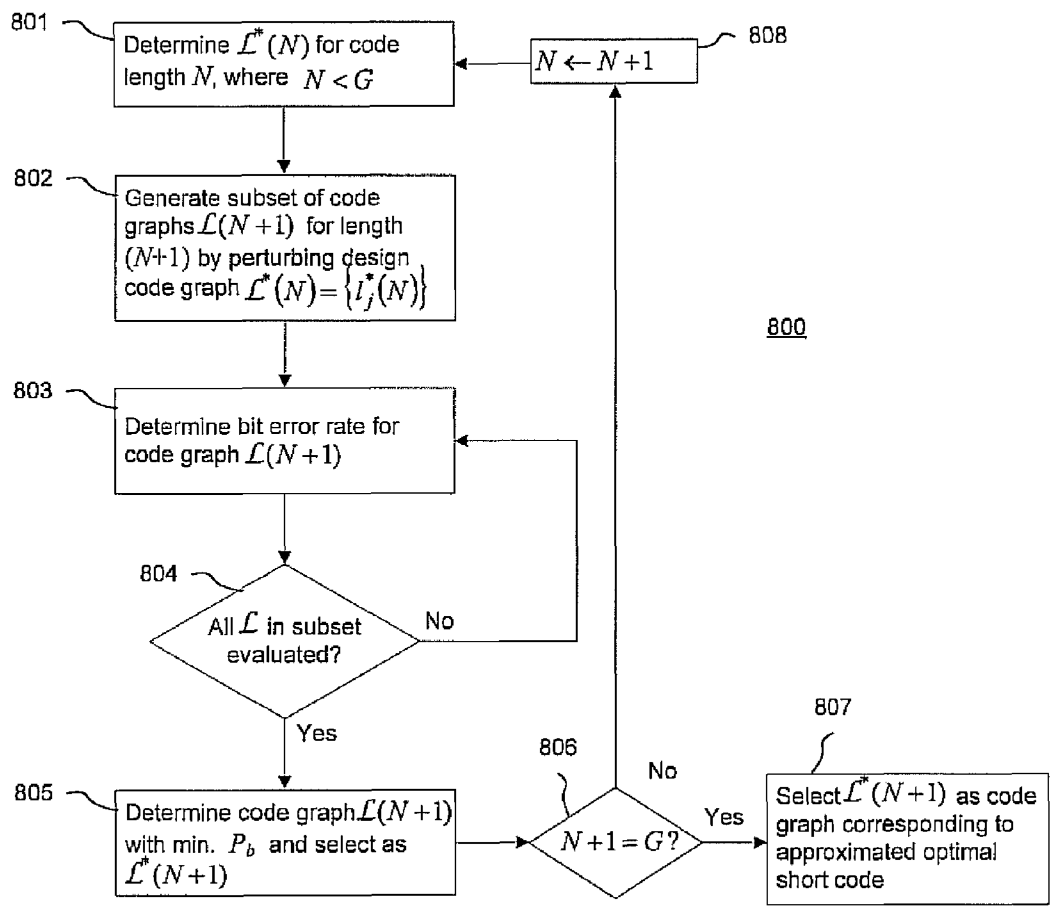
FIG. 8 depicts a high-level block/flow diagram illustrating an exemplary method for approximating a code graph corresponding to an optimal short code for large values of parity packets.

Referring now to FIG. 8 with continuing reference to FIG. 6 and FIG. 7, a high-level block/flow diagram depicting a method 800 for performing an approximation to determine optimal short codes that may be employed in step 606 is illustrated. Method 800 is an implementation of the first approximation method discussed above. Here, it is assumed that the desired optimal code corresponds to a code length of G, $\mathcal{L}^*(G)$.

At step 801, a designed optimal code graph, $\mathcal{L}^*(N)$, corresponding to a computationally convenient code length N, where N<G, may be determined or retrieved in accordance with the exhaustive search method 700 described above. In addition, as discussed below, the code graph $\mathcal{L}^*(N)$ may correspond to a code graph determined in a previous iteration in method 800.

At step 802, a subset of code graphs $\mathcal{L}(N+1)$ for length-(N+1) is generated by perturbing the designed code graph $\mathcal{L}^*(N)=\{l^*_j(N)\}$ for length-N with degree-u in accordance with equation 17, $\{l^*_j(N)-u\leqq l_j\leqq l^*_j(N)+u+1\}$, as discussed above.

It should be noted that here, all code graphs $\mathcal{L}^*(N)$ and $\mathcal{L}(N+1)$ correspond to the same value of M. Thus, the code graph $\mathcal{L}^*(N)$ represents a number of code bits that is less than the number of code bits represented by any one of code graphs $\mathcal{L}(N+1)$.

At step 803, the bit error rate for a code graph $\mathcal{L}(N+1)$ may be determined by employing equation 3, $$P_b=\sum_{n=M+1}^{N}\frac{n}{N}P_n^{(N)}+\sum_{n=0}^{M}\sum_{\varepsilon}Pr(\varepsilon\mid n)P_n^{(N)}\frac{n_a(\varepsilon)}{N},$$

or simply $$\sum_{n=1}^{M}P_n^{(N)}\sum_{\varepsilon}n_a(\varepsilon)Pr(\varepsilon\mid n),$$

as discussed above. Here, the bit error rate for $\mathcal{L}(N+1)$ in the jamming channels may be determined.

At step 804, it may be determined whether all $\mathcal{L}(N+1)$ in the subset $\{l^*_j(N)-u\leqq l_j\leqq l^*_j(N)+u+1\}$ have been evaluated. If not all $\mathcal{L}(N+1)$ in the subset have been evaluated, the process may continue to step 803 in which the bit error rate for an unevaluated $\mathcal{L}(N+1)$ is determined. If all $\mathcal{L}(N+1)$ in the subset have been evaluated, the method may proceed to step 805.

At step 805, the code graph $\mathcal{L}(N+1)$ with the minimum bit error rate $P_b$ is determined and selected as $\mathcal{L}^*(N+1)$ by employing the following:

$$\min_{\mathcal{L}}P_b(\mathcal{L})=\min_{\mathcal{L}}\sum_{n=1}^{M}P_n^{(N)}\sum_{\varepsilon}n_a(\varepsilon)Pr(\varepsilon\mid n),$$

as discussed above.

At step 806, it may be determined whether $N+1=G$.

If $N+1=G$, then, in step 807, $\mathcal{L}^*(N+1)$ is selected as the code graph corresponding to the approximated optimal short code. As discussed above, the approximated optimal short code is employed to re-encode un-recovered packets for retransmission.

If $N+1\neq G$, then the method may proceed to step 808, in which N+1 may be set to N and $\mathcal{L}^*(N+1)$, determined in step 805, is retrieved as $\mathcal{L}^*(N)$ in step 801. In this way, method 800 may be iteratively performed until the desired optimal code corresponding to a code length of G, $\mathcal{L}^*(G)$, is approximated.

Figure 9:
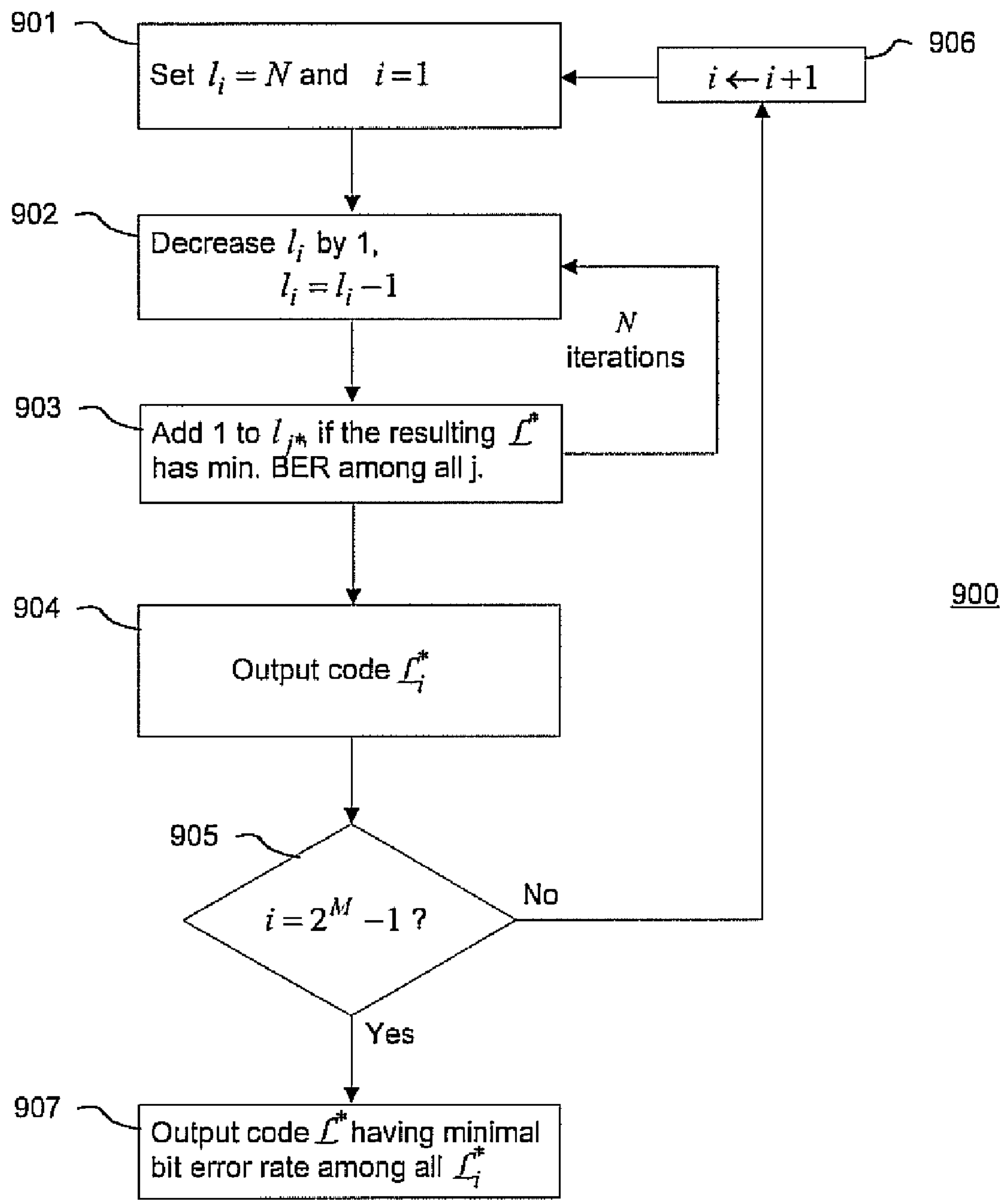
FIG. 9 depicts a high-level block/flow diagram illustrating an alternative exemplary method for approximating a code graph corresponding to an optimal short code for large values of parity packets.

Referring now to FIG. 9 with continuing reference to FIG. 6, a high-level block/flow diagram depicting an alternative method 900 for performing an approximation to determine optimal short codes that may be employed in step 606 of method 600 is illustrated. Method 900 is an implementation of the second approximation method described above. As demonstrated below, method 900 involves less computational complexity than iteratively perturbing optimal code graphs and generating subsets of code graphs.

Method 900 may begin at step 901 in which i is set to i=1 and $l_i$ is initially set to $l_i=N$ for all $j\neq i$, $l_j=0$ in code graph representation $\mathcal{L}=\{l_b, b=1,\ldots 2^M-1\}$, where element $l_i$ is the currently examined element of code graph representation $\mathcal{L}$ and the $l_j$ elements correspond to all other elements in code graph representation $\mathcal{L}$.

At step 902, $l_i$ is decreased by 1.

At step 903, 1 is added to the element that results in the $\mathcal{L}$ configuration with the lowest bit rate of all possible $\mathcal{L}$ configurations. The element to which the 1 is added is determined by calculating the bit error rate for each code graph arrangement of each element configuration and selecting the configuration and corresponding arrangement having the lowest bit error rate.

For example, in one implementation of the present principles, the $j^{*th}$ set is the set or element that results in an $\mathcal{L}_j$ configuration that has the minimum bit error rate if a node is added to it. Here, $\mathcal{L}_j$ corresponds to the temporary configurations of $\mathcal{L}$ used for calculation purposes. To obtain j*, the bit error rate for all possible node configurations and corresponding code graph arrangements of $\mathcal{L}_j$ is evaluated. In other words, $$P_b(\mathcal{L}_j)\text{ for }\mathcal{L}_j\triangleq\{l_1,\ldots,l_{j-1},l_j+1,l_{j+1},\ldots,l_{2^M-1}\},$$

for all $j=1,\ldots,2^M-1$ is determined. The $j^{th}$ set that results in an $\mathcal{L}_j^*$ configuration that has the minimum bit error rate of all configurations of $\mathcal{L}_j$ if a node is added to it is selected as j* and a node is added to it, i.e., $l^*_j\leftarrow l^*_j+1$.

It should be understood that the bit error rate for one code graph arrangement or configuration is computed for one code graph with the $j^{th}$ group to which a node is added, i.e. $l_j=l_j+1$, by employing equation 3, $$P_b=\sum_{n=M+1}^{N}\frac{n}{N}P_n^{(N)}+\sum_{n=0}^{M}\sum_{\varepsilon}Pr(\varepsilon\mid n)P_n^{(N)}\frac{n_a(\varepsilon)}{N},$$

or simply $$\sum_{n=1}^{M}P_n^{(N)}\sum_{\varepsilon}n_a(\varepsilon)Pr(\varepsilon\mid n),$$

as discussed above. As stated above, the code graph with the minimum bit error rate is selected among all j and $l^*_j$ is set to $l^*_j+1$.

Step 903 is performed for N iterations until a set $\mathcal{L}_i^*=\{l_1,\ldots,l_{2^M-1}\}$ is obtained, where $\mathcal{L}_i^*$ corresponds to the code graph representation having the lowest bit error rate among all code graph representations $\mathcal{L}_j^*$ determined for $l_i$ after N iterations.

At step 904, the results $\mathcal{L}_i^*$ for i are output and evaluated in accordance with step 907, discussed below.

At step 905, it is determined whether all i have been evaluated, or equivalently, whether $i=2^M-1$. If $i \neq 2^M-1$, then the process proceeds to step 906. If $i=2^M-1$, then the process proceeds to step 907.

At step 906, i is increased to i+1 and step 901 is performed. The process may repeat until $i=2^M-1$.

At step 907, code $\mathcal{L}^*$ having the minimal bit error rate among all $\mathcal{L}_i^*$ is selected as the code graph corresponding to the approximated optimal short code that is employed to re-encode un-recovered packets for retransmission, as discussed above.

In method implementations described above, the short codes used to encode un-recovered packets for retransmission are determined by finding a corresponding code graph having the minimum bit error rate. Specifically, both a jamming rate and the number of packets un-recovered through decoding are employed to determine the short code. In this way, by basing the short code design on a jamming rate and the number un-recovered packets, the short code is optimized for retransmission in a cognitive radio system.

Retransmission Protocols for Rateless Coding

With reference now to FIGS. 3A-3B, as mentioned above, in accordance with other implementations of the present principles, retransmission schemes may be incorporated within a rateless coding anti-jamming technique for cognitive radio systems.

In a rateless coding system, straightforward retransmission of un-recovered packets is not efficient. With reference to FIG. 3A, an exemplary retransmission protocol for an anti-jamming rateless coding scheme in accordance with aspects of the present principles is illustrated. Utilizing the advantages of the rateless feature, more parity bits of an information sequence may be generated by rateless encoding, which may form additional redundant packets for retransmission, thereby resulting in improved throughput performance, as discussed below. For example, as depicted in FIG. 3A, information lost due to un-recovered packets 356 initially transmitted in transmission T 352 may be included within a subsequent transmission block T+1 354. In block T+1 354, $n_r$ subchannels may be assigned for the retransmission of additional redundant packets $n_r$ 358 corresponding to the information sequence that was not recovered in the previous transmission T 352. Further, $N-n_r$ subchannels may be assigned for the transmission of a new information sequence in parallel with retransmission of additional redundant packets $n_r$. The number, $n_r$, subchannels assigned for additional redundant packets of a previous transmission pass may be fixed, regardless of the number of lost or un-recovered packets. With rateless encoding retransmission, signals indicating identifiers of un-recovered packets from the previous transmission T 352 need not be sent to the transmitter. Accordingly, a simple indication that the information sequence transmitted at T 352 had not been recovered may be sent to the transmitter. Such an indication may be provided by a NACK.

Referring again to FIG. 2 with continuing reference to FIG. 3A, it should be noted that the content of the additional redundant packets $n_r$ 358 is different from the content of lost packets 356. The content of the additional redundant packets $n_r$ 358 is composed of additional parity bits generated by the rateless encoding of the K blocks of an information sequence, e.g., 202, that was transmitted at T 352. Those additional redundant packets transmitted at T+1 354 may be different from any one of the N packets previously transmitted at T 352, as discussed hereinbelow.

For example, in one implementation of the present principles, a Luby-Transform (LT) code may be employed in retransmission of information corresponding to lost information packets. First, with a given input of K information symbols, which may correspond to bits or packets, i information bits may be randomly chosen according to the degree distribution ν(i), i=1, . . . , k with Σν(i)=1. The i information bits may be less than the total number of bits in a given information sequence of K information symbols. Second, a single parity-check (SPC) bit of these i information bits is determined as a coded bit. It should be understood that by repeating these two steps, as many LT coded bits as needed may be obtained.

In accordance with an aspect of the present principles, a robust Soliton distribution for μ(i) may be used in LT encoding. Given design parameters c>0 and σ, the robust Soliton distribution for a length-K information sequence may be defined as $$v(i) = \frac{\rho(i) + \tau(i)}{\sum_{j=1}^{k} (\rho(j) + \tau(j))}, \; i = 1, \ldots, k,$$

where $$\rho(i) = \begin{cases} 1/k, & i = 1, \\ \frac{1}{i(i-1)}, & i = 2, \ldots, k, \end{cases},$$

$$\tau(i) = \begin{cases} \frac{R}{ik}, & i = 1, \ldots, k/R - 1, \\ R\ln(R/\sigma)/k, & i = k/R, \\ 0 & i = k/R + 1, \ldots, k, \end{cases}, \text{ and}$$

$R=c\ln(k/\sigma)\sqrt{k}$. In addition, in one or more implementations of the present principles, pre-coding may be applied before LT encoding in accordance with raptor coding techniques.

Figure 14:
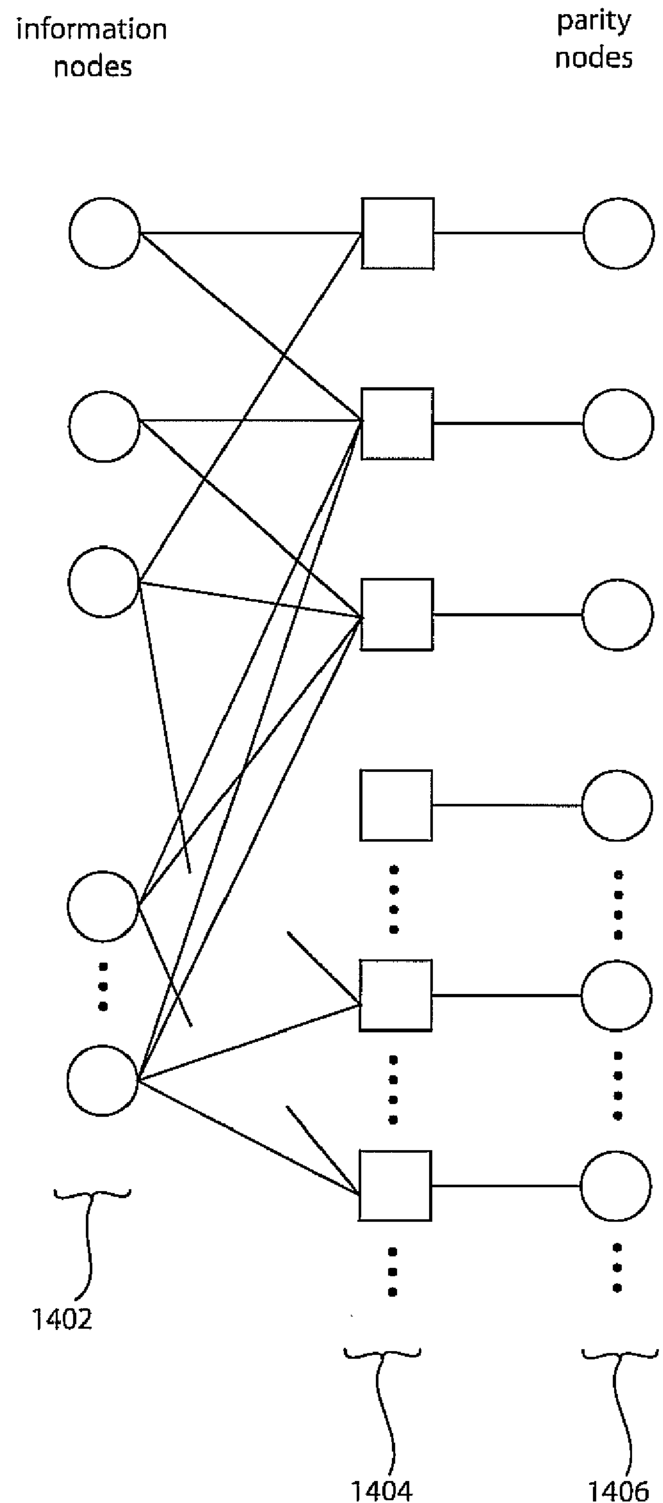
FIG. 14 depicts an exemplary bipartite graph illustrating the relationship between information bits and parity check nodes for an exemplary encoding scheme in accordance with aspects of the present principles.

With reference to FIG. 14, at a corresponding decoder, LT codes for erasure channels may be employed. In the Tanner graph of LT codes illustrated in FIG. 14, an edge connects an information bit 1402 and a coded bit 1404 if the information bit is one of the inputs from which the SPC bit 1404 was generated. The LT decoding may be performed in accordance with the following two-step process.

First, among all received coded hits 1404, the coded bits 1404 that are each connected to only one information bit 1402 are determined. Here, these information bits 1402 are referred to as the singly-recovered information bits. The singly-recovered information bits may then be recovered through their corresponding connected coded bits 1404.

Second, every connection of the singly-recovered information bits to the coded bits 1404 is determined. The binary value of any corresponding coded bit is updated by performing binary addition of the coded bit and the information bits in the connection. The connection may thereafter be removed. Subsequently, some updated coded bits with only one connection to the information bit emerge. The two steps may be repeated until all the information bits are recovered or until further recovery may not be obtained. If no newly updated coded bit with only one connection is obtained after a certain number of iterations and some un-recovered information bits remain, the decoding process is stalked. A decoding failure may then be declared.

With reference to FIG. 3A, a decoding failure indicates that an information sequence of K information bits has not been recovered. In such circumstances, as mentioned above, retransmission protocols in accordance with aspects of present principles may be applied. For example, in the next transmission pass, after receiving an indication of an un-recovered information sequence K, transmitted at T 352, for example, additional information bits from the sequence may be included in the set i mentioned above for LT encoding and generation of single parity bits. Thus, the information sequence corresponding to all packets transmitted during the transmission T 352 may be employed to generate additional or new single parity-check bits for retransmission. In this way, the $n_r$ packets formed by additional single parity check bits 358 generated for retransmission at T+1 354 may be completely different from any N packets transmitted at T 352. In addition, it should be understood that the single parity check bits need not be generated from the entire information sequence. For example, as stated above, i information bits may be randomly chosen from the information sequence to generate a single parity check bit. Further, the additional single parity check bits generated for retransmission in response to receiving an indication of an un-recovered information sequence may be new in the sense that they are different from rateless encoded bits transmitted in a previous transmission pass due to a different selection of i information bits.

While two settings, setting A and setting B, discussed below, employ single parity check bits $n_r$ that were generated from only information bits of the information sequence K transmitted at a previous transmission T 352, it should be understood that one of ordinary skill in the art may extend the principles disclosed herein to generate single parity-check bits for retransmission by employing both new and un-recovered information bits.

Returning to FIG. 3A, the remaining $N-n_r$ subchannels may be allocated for the transmission of subsequent data packets in the transmission queue. After retransmission, if the receiver does not recover the information packets, additional parity packets may be generated again and transmitted in the next transmission block. The maximum number of retransmissions may be denoted as $L_m$.

Referring now to FIG. 3B, with $n_r$ subchannels assigned for retransmission, in accordance with aspects of the present principles, two settings for retransmission, wherein $N-n_r$ subchannels may be employed for the transmission of subsequent data packets in the transmission queue, are illustrated. In setting A 360, K blocks of a new information sequence are carried by $N-n_r$ rateless coded packets that are transmitted along K subchannels 364 and $M-n_r$ 362 subchannels in transmission block T+1 361. $M-n_r$ 362 subchannels are allocated for $M-n_r$ redundant packets for the K blocks of the new information sequence. In setting B 370, $K-n_r$ blocks of a new information sequence are carried by $N-n_r$ rateless coded packets that are transmitted along $K-n_r$ subchannels 374 and M subchannels 372 in transmission block T+1 371. Here, M subchannels 372 are retained for M redundant packets for $K-n_r$ blocks of a new information sequence. Of course, setting A 360 incurs less redundancy and higher throughput. However, less redundancy leads to higher error probability for the transmission of K packets in setting A 360, which consequently may increase the number of retransmissions. In some cases, the number of retransmission blocks in the queue may cause a backlog, which may in turn cause system instability. With setting B, wherein less information packets are transmitted and the same redundancy is retained, the code rate is lower, resulting in a lower error probability. Thus, although setting A may provide high throughput, while setting B may provide a more reliable retransmission protocol.

it should be noted that in accordance with a rateless encoding scheme, there is a certain convergence region of jamming rates beyond which the retransmission process may be unstable. $P_w^{(N-n_r,K)}(l)$ and $P_w^{(N-n_r,K-n_r)}(l)$ may be denoted as the decoding error probabilities after the lth retransmission for setting A and setting B, respectively. It can be shown that the stability condition for both setting A and setting B for a certain $L_m$ is $b_{n_r} \leqq 1$, where $$b_{n_r} \triangleq \sum_{l=0}^{L_m-1} P_w^{(N-n_r,K)}(l)$$

for setting A and $$b_{n_r} \triangleq \sum_{l=0}^{L_m-1} P_w^{(N-n_r,K-n_r)}(l)$$

for setting B for general $n_r$.

Figure 10:
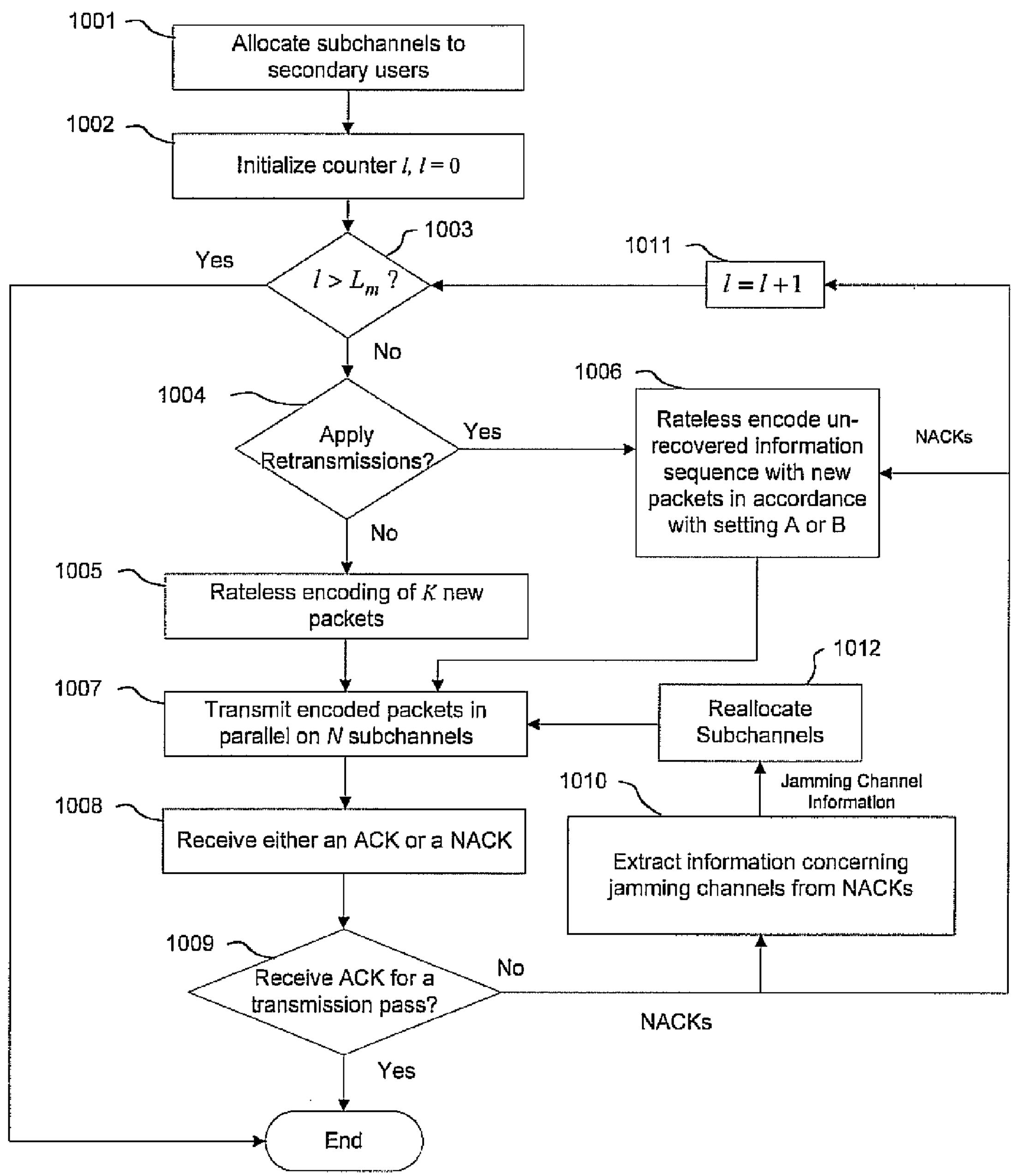
FIG. 10 depicts a high-level block/flow diagram illustrating an exemplary method for retransmitting un-recovered portions of an information sequence based on a rateless encoding, anti-jamming/cognitive radio technique.

With reference now to FIG. 10 with continuing reference to FIGS. 3A-3B and FIG. 2, an exemplary method 1000 for retransmitting an un-recovered information sequence by employing an anti-jamming rateless coding scheme in accordance with one or more implementations of the present principles is illustrated. Method 1000 may begin at step 1001 in which subchannels may be allocated for secondary usage by utilizing a spectrum sensing system, as discussed above. In this exemplary implementation, it is assumed that N subchannels are allocated to one user for the transmission of K packets, each of which is of length-L. The redundancy may occupy M subchannels, wherein $M=N-K$ subchannels.

At step 1002, a transmission counter may be initialized such that l=0.

At step 1003, it is determined whether l is greater than $L_m$. Here, $L_m$ may correspond to the maximum number of retransmissions that may be performed before timeout. Thus, if $l>L_m$, the retransmission process may end. Otherwise, the method may continue.

At step 1004, it is determined whether retransmissions should be applied. The determination may be based on any received NACKs, as discussed below, or may be determined based on the value of l. For example, an l>0 may be an indication that a retransmission should be performed. If retransmissions should not be applied, the method may proceed to step 1005. Otherwise, the method may proceed to step 1006.

At step 1005, all new K information packets may be encoded by employing a rateless coding scheme, as discussed above with respect to FIG. 2.

Returning to step 1006, at step 1006, an information sequence that was not recovered as a result of decoding may be encoded using a rateless encoding scheme to form $n_r$ 358 packets for transmission along $n_r$ subchannels, as discussed above, for example, with respect to FIGS. 3A-3B. The remaining packets may be encoded in accordance with setting A or setting B, as discussed above with respect to FIG. 3B, for transmission along the remaining $N-n_r$ subchannels. For example, in setting A, K subsequent information packets may be encoded to form $N-n_r$ rateless coded packets and, in setting B, $K-n_r$ subsequent information packets may be encoded to form $N-n_r$ rateless coded packets, as discussed above with respect to FIG. 3B. Thus, as discussed above with respect to FIG. 3B, $M-n_r$ packets are employed for redundancy in setting A and M packets are employed for redundancy in setting B.

Furthermore, it should also be noted that at step 1006, a single parity check bit may be generated from a plurality of un-recovered bits within an un-recovered information sequence. As discussed above, in accordance with one or more implementations of the present principles, one or more additional or new single parity-check bits may be generated for retransmission by employing an un-recovered information sequence. An indication that an information sequence transmitted in a pass was not recovered through decoding may be provided by a NACK, as discussed above.

Subsequent to encoding at either of steps 1005 and 1006, at step 1007, N coded packets may be transmitted in parallel through N subchannels, as discussed above. The subchannels on which the N coded packets are transmitted may correspond to the subchannels allocated in step 1001 or the subchannels allocated in step 1012, as discussed below. In addition, in accordance with one or more aspects of the present principles, $n_r$ subchannels may be allocated for retransmission of additional single parity check bits. The number, $n_r$, of subchannels allocated for retransmission of additional single parity check bits may be fixed, regardless of the number of un-recovered or lost packets from a previous transmission pass.

At step 1008, either an ACKs or NACKs may be received from a receiver for a transmission pass. For rateless encoding retransmission protocols according to aspects of the present principles, an ACK may indicate that the information sequence transmitted in a transmission pass has been recovered while a NACK may indicate that the information sequence transmitted in a transmission pass has not been recovered.

At step 1009, it is determined whether packet an ACK for an information sequence transmitted through a transmission pass has been received from a receiver. If an ACK has been received, then the retransmission process may end. If a NACK has been received for an information sequence transmitted in a previous transmission pass from a receiver, then the process may continue to step 1010.

At step 1010, information concerning jamming channels may be extracted from one or more NACKs for utilization in step 1012.

At step 1011, l may be increased by one by the counter to permit monitoring of the number of transmissions.

At step 1012, sub-channels may be reallocated for use in parallel transmission step 1007 in the next transmission pass by employing jamming information extracted from NACKs. For example, alternate sub-channels may be reallocated for secondary usage to avoid an equal number of jamming channels, for example, employed by primary users, as discussed above.

The process may repeat until it is determined that no NACKs are received at step 1009 or until timeout.

Figure 11:
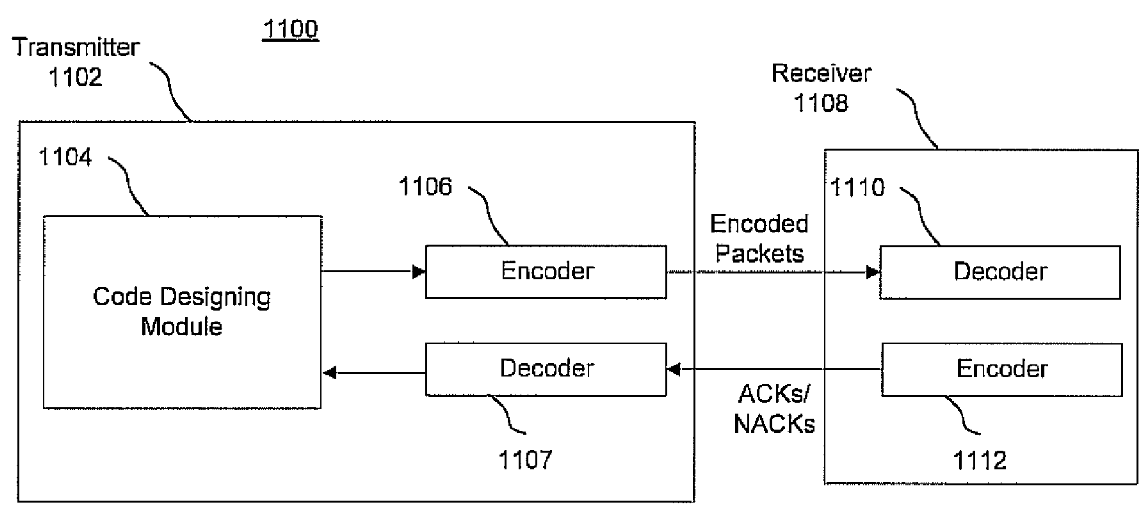
FIG. 11 depicts a high-level block/flow diagram illustrating an exemplary system for retransmitting un-recovered information utilizing anti-jamming/cognitive radio encoding techniques.

Referring now to FIG. 11 with continuing reference to FIGS. 4 and 10, a high-level block for diagram illustrating a cognitive radio, anti-jamming retransmission system 1100 in accordance with aspects of the present principles is illustrated. The system 1100 may include a transmitter 1102 and a receiver 1108. Although elements 1102 and 1108 are referred to here for simplicity of understanding as a transmitter and a receiver, respectively, it should be understood that either one or both of elements 1102 and 1108 may be configured to both receive and transmit information, as known to those of skill in the art. Furthermore, it should also be understood that although only one transmitter 1102 and one receiver 1108 are illustrated, either or both transmitter 1102 and receiver 1108 may be configured to communicate with a plurality of transmitters and/or receivers.

Transmitter 1102 may include a code designing module 1104, an encoder 1106 and a decoder 1107. The code designing module 1104 may be configured to perform one, more than one, or all of steps 401-415 and steps discussed in detail above. In addition, the code designing module 1104 may be further configured to employ the encoder 1106 to encode information sequences and/or packets in accordance with one, more than one or all of steps 407, 1005 and 1006. Similarly, the code designing module 1104 may be further configured to employ the decoder 1107 to decode ACKs and NACKs received from a receiver in accordance with step 412 and/or step 1010, for example. Additionally, encoded data packets may be transmitted from the transmitter 1102 to the receiver 1108 through N subchannels, as discussed above. Further, the code designing module 1104, encoder 1106 and decoder 1107 may be implemented in software and/or hardware utilizing a processor and computer-readable memory.

Receiver 1108 may include a decoder 1110 and an encoder 1112. The decoder 1110 may be configured to decode packets transmitted from transmitter 1102. Similarly, encoder 1112 may be configured to encode ACKs and NACKs for transmission to transmitter 1102. The decoder 1110 and encoder 1112 may be implemented in software and/or hardware utilizing a processor and computer-readable memory.

Analysis of the above-recited retransmission schemes for both piecewise and rateless encoding schemes has revealed that a significant improvement of throughput performance may be achieved over known methods. For example, with regard to the short code optimization retransmission scheme discussed above, improvement of throughput performance over schemes in which a short code is optimized with minimal overhead without consideration of a jamming rate and schemes in which a short code is randomly generated has been confirmed.

Furthermore, it should be noted that comparison between the retransmission schemes discussed above with respect to piecewise and rateless encoding techniques indicates that both retransmission schemes have similar performance, except that the short code optimization retransmission scheme has more flexibility without any convergence problem. Moreover, analysis has also revealed that, for rateless encoding, the jamming rate threshold p of the convergence region increases as M increases, indicating improvement of system reliability with increasing M.

In addition, the throughput performance of the retransmission protocols using an anti-jamming rateless coding scheme with various $n_r$'s, e.g., $n_r$=1,2,5, and 10, has been examined. In setting B, the p threshold for system convergence increases as $n_r$ increases, indicating that increasing $n_r$ may enhance system stability. However, the throughput performance may degrade as $n_r$ increases. For example, when $n_r$=10, the resulting throughput performance is worse than an analogous throughput performance of a short code optimization retransmission scheme discussed above. Thus, $n_r$ and M should be selected in way that balances performance and system stability.

As stated above, implementations of the present principles significantly improve throughput performance for cognitive radio systems. For example, implementations of the present principles include optimizing short codes for retransmission by employing both a jamming rate and the number of packets that are un-recovered to select the codes such that a probability of packet loss is minimized. Furthermore, implementations of the present principles may also utilize rateless encoded additional parity bits and negative acknowledgments for retransmission of un-recovered information sequences to improve throughput performance. Thus, in accordance with aspects of the present principles, the re-encoding process may be optimized for retransmission and employed to encode un-recovered information.

It should be understood that implementations described herein may be entirely hardware, entirely software or include both hardware and software elements. For example, the present principles may be implemented in software, which includes but is not limited to firmware, resident software, microcode, etc.

Implementations may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described implementations of methods and systems (which are intended to be illustrative and not limiting), it is noted that modifications and variations can be made by persons skilled in the art in light of the above teachings. It is therefore to be understood that changes may be made in the particular implementations disclosed which are within the scope and spirit of the invention as outlined by the appended claims. Having thus described aspects of the present principles, with the details and particularity required by the patent laws, what is claimed and desired protected by Letters Patent is set forth in the appended claims.

What is claimed is:

1. A method for retransmitting information in accordance with a cognitive radio, anti-jamming coding scheme comprising:

receiving an indication of un-recovered packets;

determining that a first code graph including a representation of code bits within un-recovered packets has a minimum bit error probability by employing a jamming rate and a total number of packets that are un-recovered through decoding;

encoding at least one of the un-recovered packets by applying a code based on the first code graph; and retransmitting at least one encoded un-recovered packet;

wherein the determining comprises:

setting a first element of a code graph representation to a total number of packets transmitted in parallel;

iteratively decreasing a value of the first element to thereby distribute a value of a total number of packets transmitted in parallel to other elements in the code graph representation, wherein distribution is based on calculating a minimum bit error probability for each code graph configuration at each iteration step.

2. The method of claim 1, further comprising:

generating a subset of code graphs by perturbing a code graph representation of a number of code bits that is less than the number of code bits represented by one of the code graphs within the subset of code graphs, wherein the first code graph is determined to have the minimum bit error probability of the subset of code graphs.

3. The method of claim 2, wherein the generating is performed iteratively until a subset of code graphs corresponding to the number of bits represented by the first code graph is obtained.

4. The method of claim 1, further comprising:

evaluating all possible code graphs for a code length value to determine that the first code graph has the minimum bit error probability.

5. The method of claim 1, wherein the total number of packets are a total number of packets that are un-recovered through one transmission pass.

6. The method of claim 1, wherein the first code graph is represented by a cardinality set with $2^M-1$ elements, wherein M is a number of parity packets transmitted.

7. The method of claim 1, wherein the number of un-recovered packets corresponds to the number of residual erasure bits that are un-recovered as a result of iterative decoding.

8. The method of claim 1, wherein the at least one encoded un-recovered packet is retransmitted through channels in parallel with new packets that succeed an originally transmitted packet corresponding to the at least one encoded un-recovered packet in a transmission queue.

9. The method of claim 1, further comprising:

determining whether un-recovered packets are parity packets or information packets, wherein the retransmitting further comprises retransmitting only un-recovered information packets.

10. A method for retransmitting information in accordance with a cognitive radio, anti-jamming rateless encoding scheme comprising:

receiving an indication that an information sequence included within transmitted information packets is un-recovered through decoding;

generating additional parity bits from the un-recovered information sequence in accordance with a rateless encoding scheme in response to receiving the indication; and transmitting the additional parity bits.

11. The method of claim 10, wherein the additional parity bits are transmitted through a fixed number of channels.

12. The method of claim 10, wherein the additional parity bits are transmitted in parallel with new information packets including information bits selected from a new information sequence that was not previously encoded for transmission.

13. The method of claim 12, wherein a total number of new information packets transmitted is less than a total number of information packets transmitted in a previous transmission pass to permit the transmission of the additional parity bits.

14. The method of claim 12, wherein a total number of redundant packets for the new information sequence transmitted is less than a total number of redundant packets transmitted in a previous transmission pass to permit transmission of the additional parity bits.

* * * * *